United States Patent
Chihara

(10) Patent No.: US 7,973,959 B2
(45) Date of Patent: Jul. 5, 2011

(54) DOCUMENT ADMINISTRATION SYSTEM AND DOCUMENT DESTRUCTION APPARATUS

(75) Inventor: Shingo Chihara, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 896 days.

(21) Appl. No.: 11/889,502

(22) Filed: Aug. 14, 2007

(65) Prior Publication Data

US 2008/0088873 A1    Apr. 17, 2008

(30) Foreign Application Priority Data

Oct. 13, 2006   (JP) ................................ 2006-280565

(51) Int. Cl.
*G06F 3/12* (2006.01)

(52) U.S. Cl. ....... 358/1.15; 358/403; 358/474; 382/173; 241/34; 241/36

(58) Field of Classification Search .................. 358/1.15, 358/474, 442, 403, 400; 707/999.2, E17.008, 707/E17.095, 202; 382/137, 115, 116; 241/34, 241/36, 222, 236
See application file for complete search history.

(56) References Cited

U.S. PATENT DOCUMENTS

| | | | | |
|---|---|---|---|---|
| 5,188,301 A * | 2/1993 | Hasegawa | ........................ | 241/33 |
| 5,354,001 A | 10/1994 | Hasegawa | | |
| 6,035,035 A * | 3/2000 | Firooz | ........................ | 379/433.1 |
| 6,185,576 B1 * | 2/2001 | McIntosh | .............................. | 1/1 |
| 7,532,761 B2 * | 5/2009 | Tredoux | ........................ | 382/232 |
| 7,665,679 B2 * | 2/2010 | Hamasuna et al. | .............. | 241/36 |
| 2002/0010708 A1 * | 1/2002 | McIntosh | ...................... | 707/500 |
| 2002/0070300 A1 * | 6/2002 | McLean et al. | .................. | 241/30 |
| 2007/0026371 A1 * | 2/2007 | Wood | ............................. | 434/317 |
| 2007/0075168 A1 * | 4/2007 | Rodriguez et al. | .............. | 241/36 |
| 2007/0080249 A1 * | 4/2007 | Hamasuna et al. | .............. | 241/36 |
| 2007/0124077 A1 * | 5/2007 | Hedlund, Jr. | .................. | 701/300 |
| 2007/0260464 A1 * | 11/2007 | DiMarino et al. | ................ | 705/1 |
| 2008/0005194 A1 * | 1/2008 | Smolen et al. | ................ | 707/202 |
| 2008/0029628 A1 * | 2/2008 | Rodriguez et al. | .............. | 241/36 |

FOREIGN PATENT DOCUMENTS

JP    A-04-130860    5/1992

(Continued)

OTHER PUBLICATIONS

Office Action issued in JP Application No. 2007-263647 on Jan. 11, 2011 (with English translation).

*Primary Examiner* — Negussie Worku

(74) *Attorney, Agent, or Firm* — Oliff & Berridge, PLC

(57) ABSTRACT

A document administration system includes a document administration apparatus and a document destruction apparatus. The document administration apparatus includes a document administration information storage section that stores administration information containing at least document identification information assigned to a document and a retention period of the document. The document destruction apparatus includes an identification information reader, a determination section and a document reader. The identification information reader reads the document identification information assigned to the document. The determination section determines, based on a reading result by the identification information reader, as to whether or not the document identification information is assigned to the document. The document reader reads the document to acquire an image of the document if the document meets a predetermined read condition. The document reader reads the document to acquire the image of the document if no document identification information is assigned to the document.

34 Claims, 23 Drawing Sheets

FOREIGN PATENT DOCUMENTS

| | | |
|---|---|---|
| JP | A-05-083499 | 4/1993 |
| JP | A 11-339024 | 12/1999 |
| JP | A 2002-342329 | 11/2002 |
| JP | A 2003-62476 | 3/2003 |
| JP | A 2005-190365 | 7/2005 |
| JP | A-2005-262135 | 9/2005 |
| JP | A-2006-262135 | 9/2005 |
| JP | A-2006-102572 | 4/2006 |

* cited by examiner

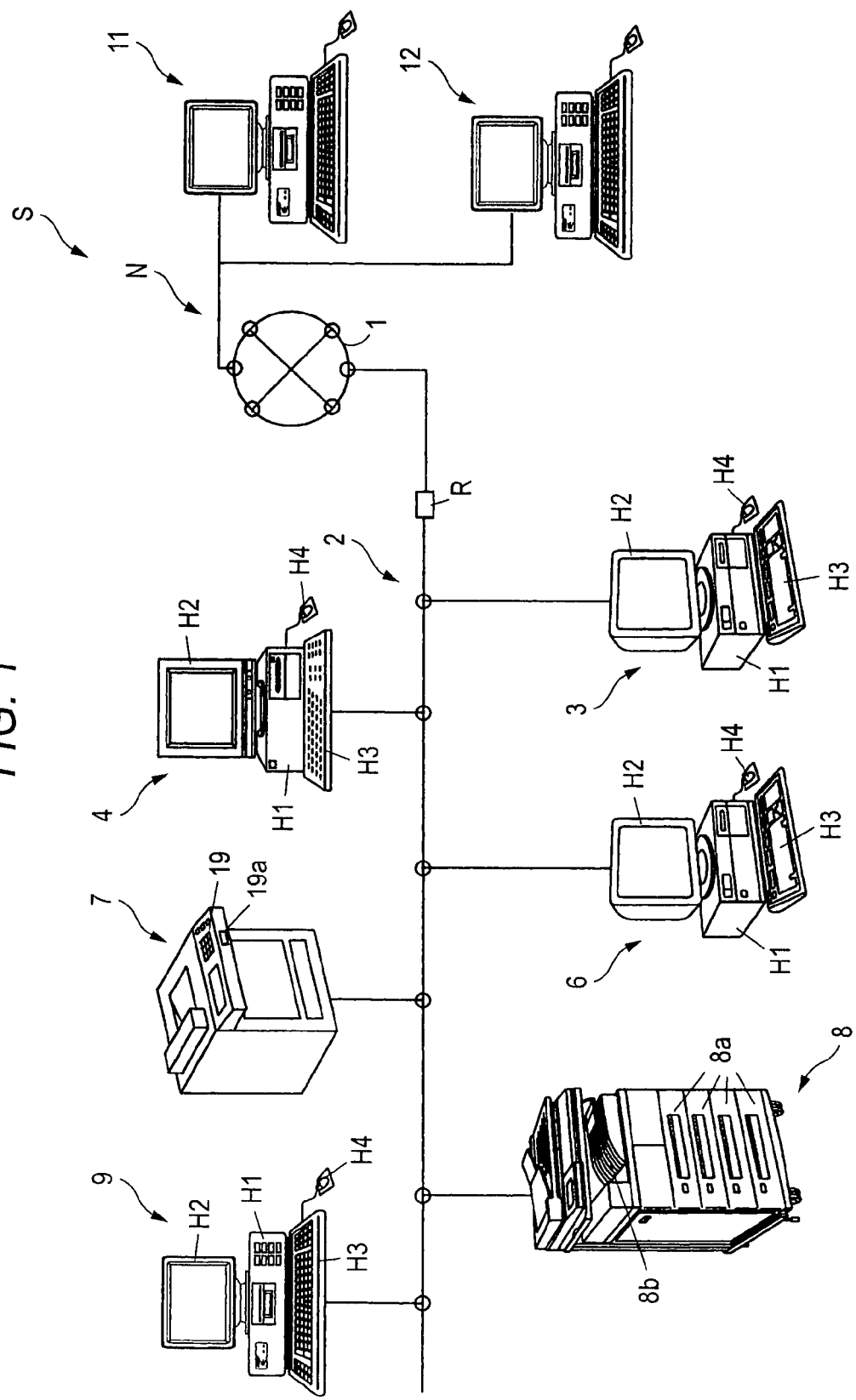

FIG. 4

| PROCESS ID | DOCUMENT CREATION DATE | DOCUMENT RETENTION PERIOD | DOCUMENT CREATOR ID | DOCUMENT ADMINI-STRATOR ID | DOCUMENT TYPE | DOCUMENT IMAGE DATA | DOCUMENT DESTRUC-TION DATE | DOCUMENT DESTRUC-TION APPA-RATUS ID | DOCUMENT DESTRUC-TION OPERATOR | DESTRUC-TION DOCUMENT IMAGE DATA | DESTRUC-TION FAILURE ID | DEST-RUCTION FAILURE APPA-RATUS ID | DEST-RUCTION FAILURE DATE |
|---|---|---|---|---|---|---|---|---|---|---|---|---|---|
| 000000000001 | 1998.1.1 | 2004.12.31 | 100 | – | RECEIPT | image201 | 2005.1.10 | No. 50 | 100 | | | | |
| 000000000002 | 1999.10.1 | 2004.9.30 | 101 | 331 | ORDER SHEET | | 2004.10.2 | No. 50 | 300 | image001 | | | |
| ⋮ | ⋮ | ⋮ | ⋮ | ⋮ | ⋮ | ⋮ | ⋮ | ⋮ | ⋮ | ⋮ | | | |
| 000000001007 | 2000.1.15 | – | 200 | 331 | NONE | | 2000.10.5 | No. 11 | 400 | | | | |
| ⋮ | ⋮ | ⋮ | ⋮ | ⋮ | ⋮ | ⋮ | ⋮ | ⋮ | ⋮ | ⋮ | | | |
| 000000002000 | 2002.2.17 | PERMANENT | 300 | 331 | PERMANENT | | NOT DES-TRUCTED | – | – | | 100 | No. 50 | 2005.1.10 |
| ⋮ | ⋮ | ⋮ | ⋮ | ⋮ | ⋮ | ⋮ | ⋮ | ⋮ | ⋮ | ⋮ | | | |
| 000000002201 | 2002.9.1 | 2003.8.31 | 101 | 101 | MEETING MINUTE | | 2003.9.10 | No. 20 | 500 | | | | |
| ⋮ | ⋮ | ⋮ | ⋮ | ⋮ | ⋮ | ⋮ | ⋮ | ⋮ | ⋮ | ⋮ | | | |
| image100 | – | – | – | – | – | – | 2005.10.10 | No. 10 | 800 | image100 | | | |
| image101 | – | – | – | – | – | – | 2005.10.19 | No. 10 | 500 | image101 | | | |
| image102 | ⋮ | – | – | – | – | – | – | – | – | – | 200 | No. 20 | 2002.9.10 |

FIG. 6

ADMINISTRATION INFORMATION NEW REGISTRATION SCREEN

PROCESS ID  [ 0 0 0 0 0 0 1 ] — 41a

DOCUMENT ADMINISTRATOR ID [ ] — 41b

DOCUMENT CREATOR ID [ 1 0 0 ] — 41c

DOCUMENT TYPE  [✓] COMMERCIAL BUSINESS FORM (RETENTION PERIOD 10 YEARS)

[ ] RECEIPT (RETENTION PERIOD 7 YEARS)

[ ] ORDER SHEET (RETENTION PERIOD 5 YEARS)

[ ] TECHNICAL REPORT (RETENTION PERIOD 10 YEARS)

[ ] MEETING MINUTE (RETENTION PERIOD 1 YEAR)

[ ] OTHERS          RETENTION PERIOD [ ] PERMANENT

[ ] NONE — 41f

[ PRINT ] — 41e          [ SCAN ]

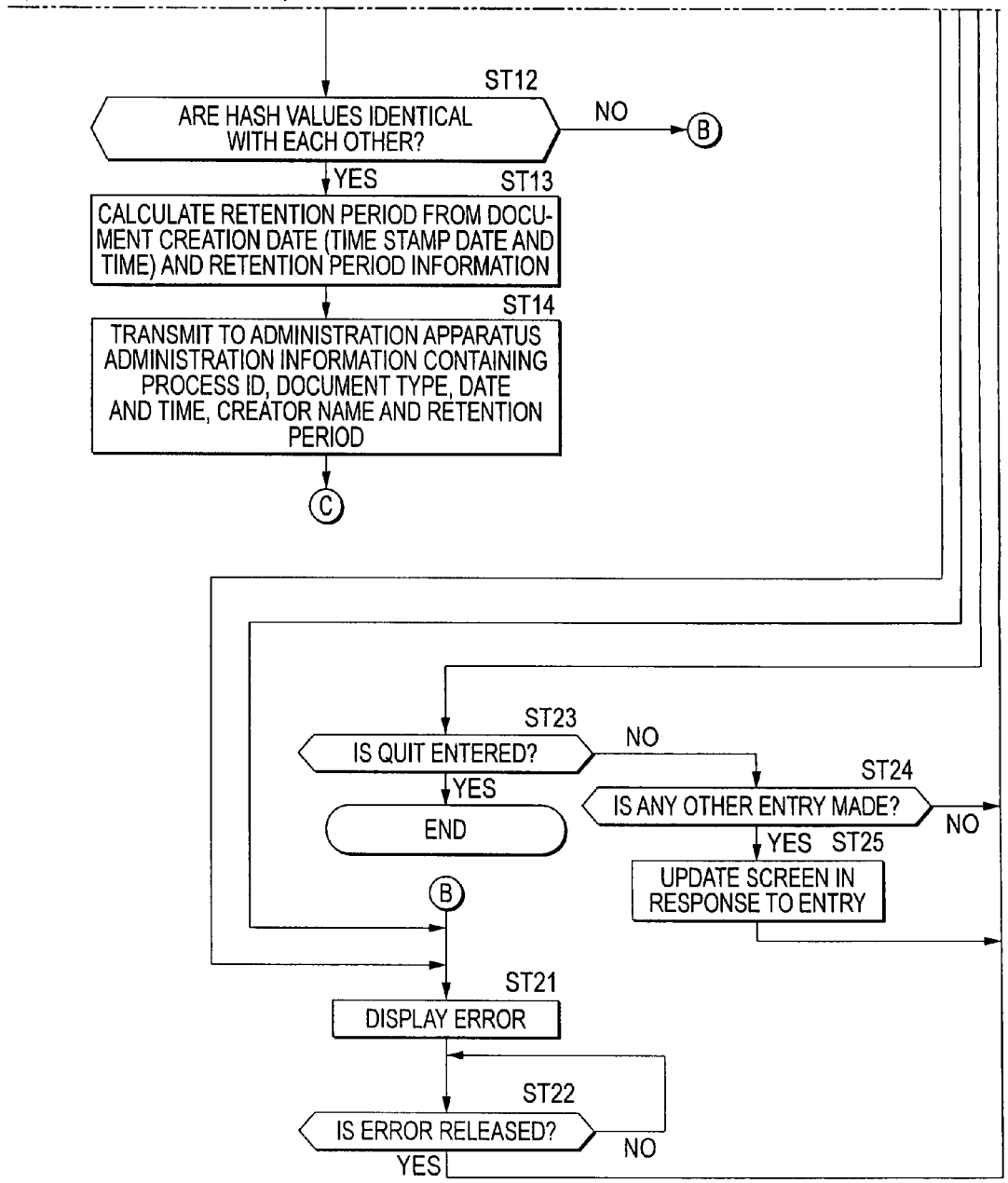

FIG. 20
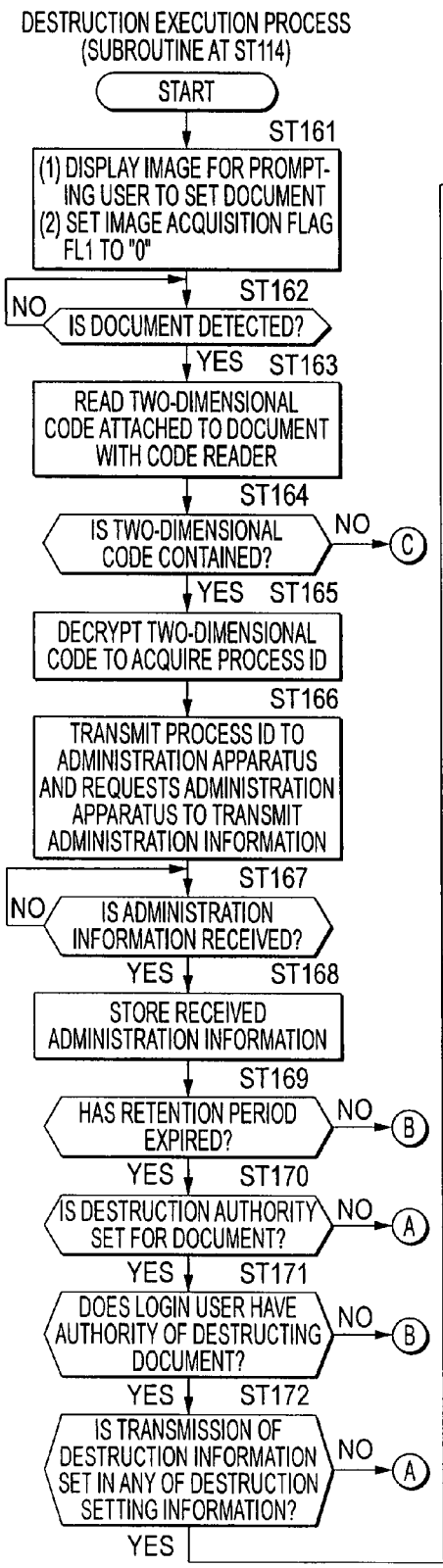
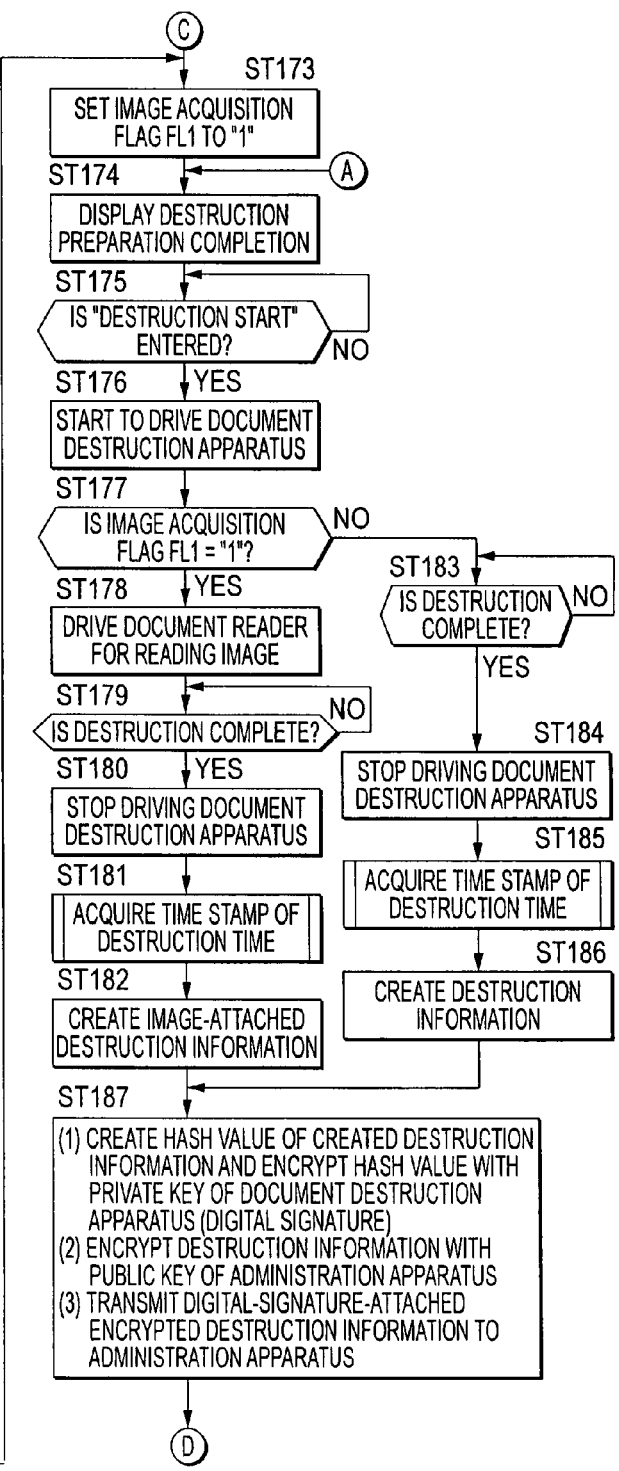

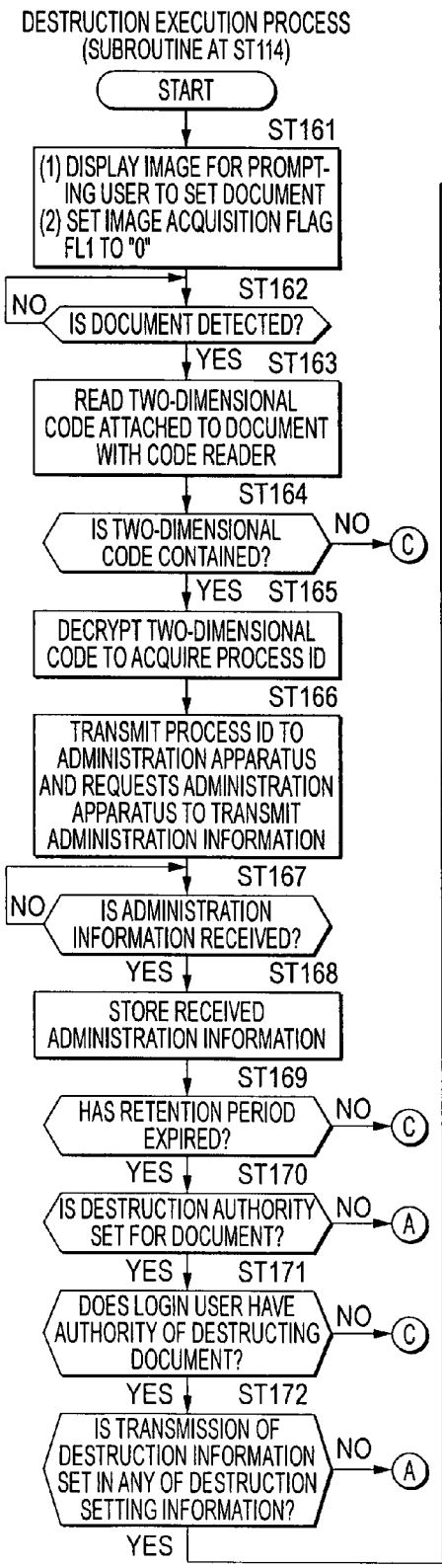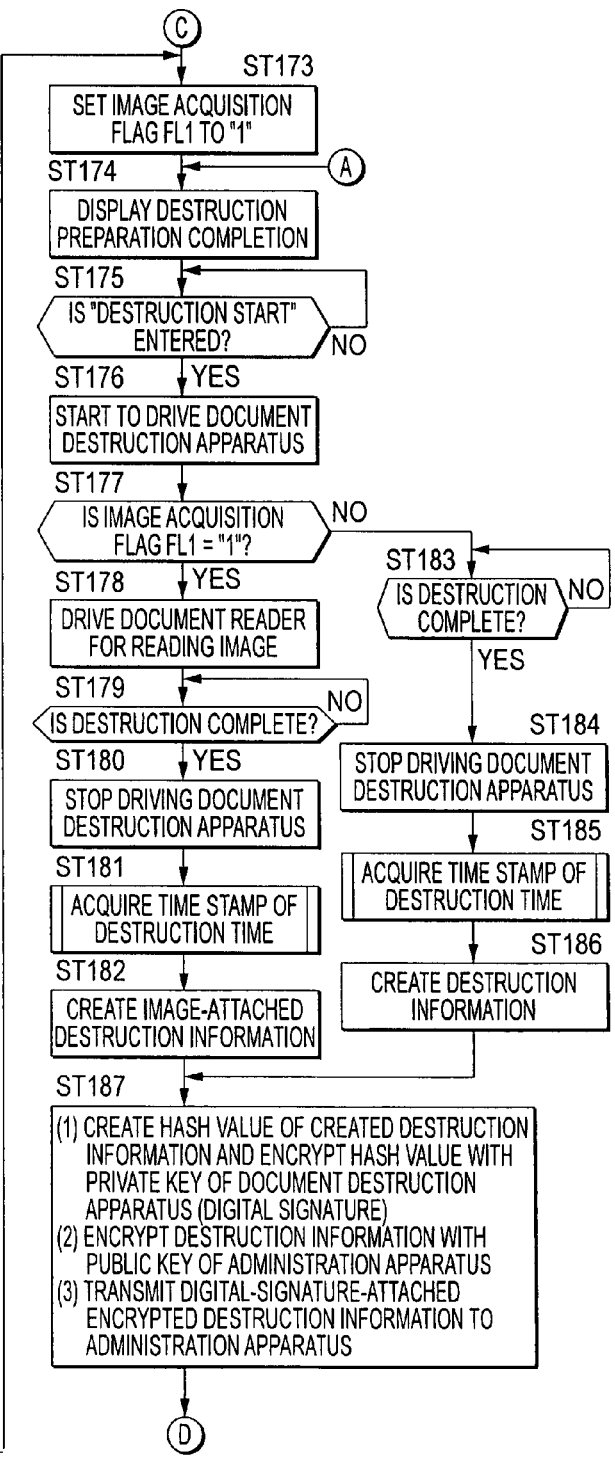
FIG. 23

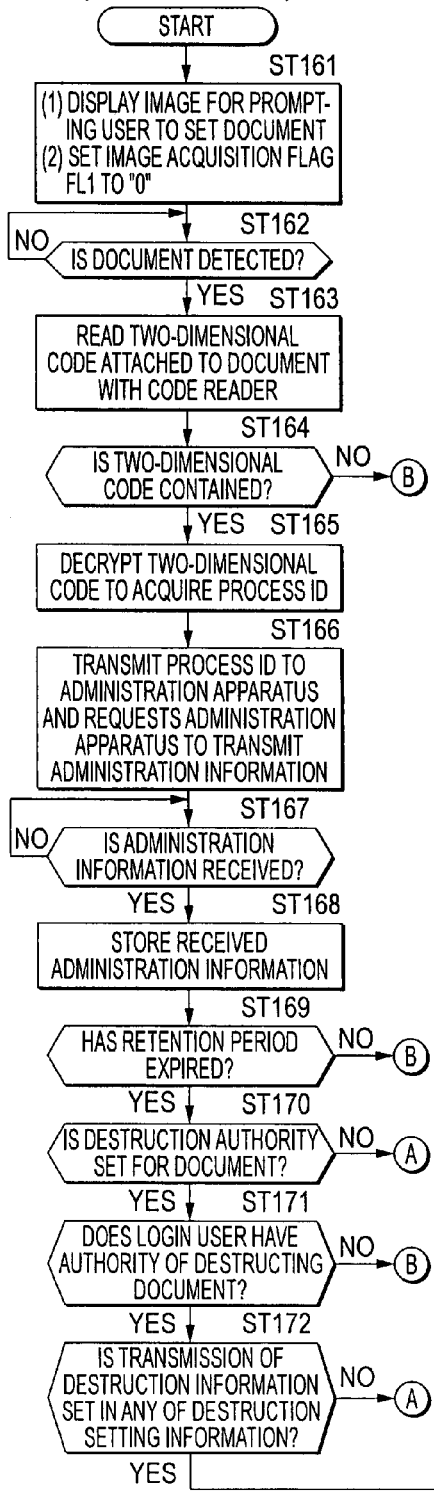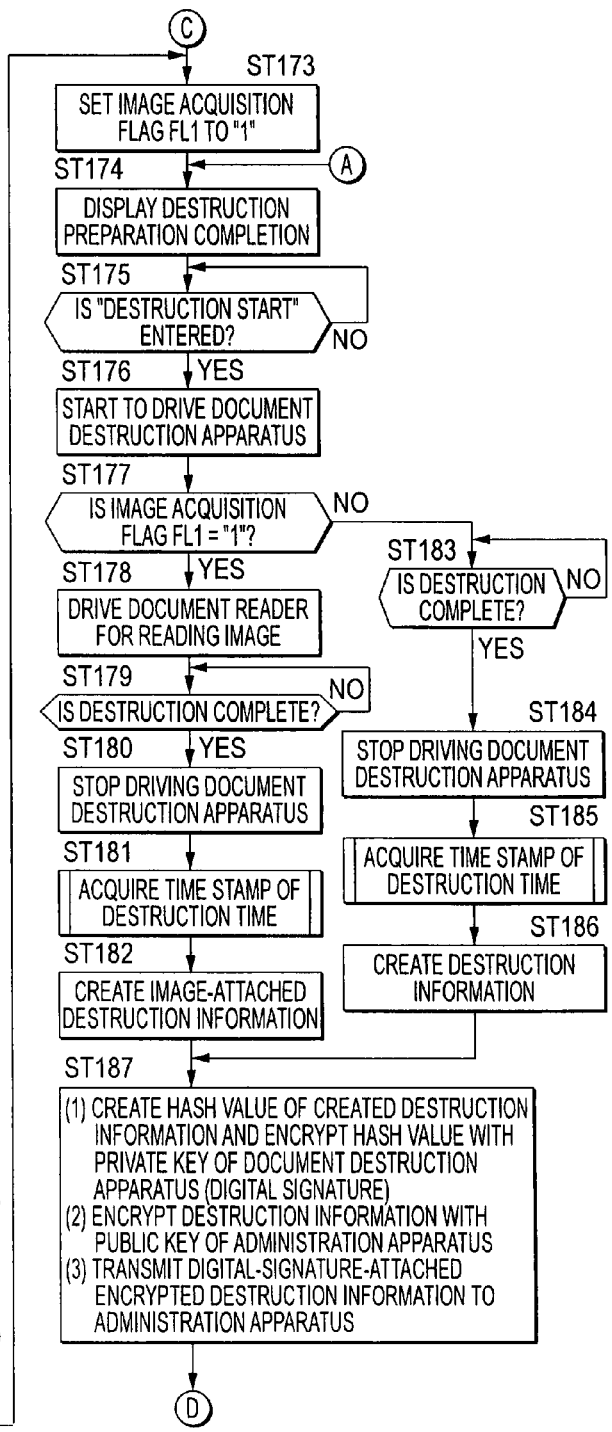
FIG. 24

DOCUMENT ADMINISTRATION SYSTEM AND DOCUMENT DESTRUCTION APPARATUS

CROSS-REFERENCE TO RELATED APPLICATIONS

This application is based on and claims priority under 35 U.S.C. §119 from Japanese Patent Application No. 2006-280565 filed on Oct. 13, 2006.

BACKGROUND

1. Technical Field

The invention relates to a document administration system for managing a document and a document destruction apparatus for destructing a document.

2. Related Art

Generally, confidential documents such as a restricted document or a document which should not be presented to anyone outside of a company are often handled in enterprise offices and public institutions such as a city office. To prevent leakage to a third party, originals of such confidential documents are stored under strict management. The confidential documents which become unnecessary are destructed using a shredder, etc.

SUMMARY

According to an aspect of the invention, a document administration system includes a document administration apparatus and a document destruction apparatus. The document administration apparatus includes a document administration information storage section and a document image storage section. The document administration information storage section stores administration information containing at least document identification information assigned to a document and a retention period of the document. The document destruction apparatus includes an identification information reader, a first determination section and a document reader. The identification information reader reads, from the document, the document identification information assigned to the document. The first determination section determines, based on a reading result by the identification information reader, as to whether or not the document identification information is assigned to the document. If the document meets a predetermined read condition, the document reader reads the document to acquire an image of the document. If no document identification information is assigned to the document, the document reader reads the document to acquire the image of the document and the document image storage section stores the image of the document acquired by the document reader.

BRIEF DESCRIPTION OF THE DRAWINGS

Exemplary embodiments of the invention will be described below in detail with reference to the accompanying drawings, wherein:

FIG. 1 is a general schematic representation of a document administration system according to a first exemplary embodiment of the invention;

FIG. 2 is a schematic representation of a document destruction apparatus according to the first exemplary embodiment of the invention.

FIG. 4 is a schematic representation of document administration information of the first exemplary embodiment of the invention;

FIG. 6 is a schematic representation of an administration information registration screen according to the first exemplary embodiment of the invention;

FIG. 7 is a schematic representation of an example of a receipt according to the first exemplary embodiment of the invention.

FIG. 20 is a flowchart of a destruction execution process according to the first exemplary embodiment of the invention to describe the subroutine at ST114 in FIG. 18;

FIG. 23 is a flowchart of the destruction execution process according to a second exemplary embodiment of the invention and corresponds to FIG. 20 in the first exemplary embodiment of the invention;

FIG. 24 is a flowchart of a destruction execution process according to a third exemplary embodiment of the invention and corresponds to FIG. 20 in the first exemplary embodiment of the invention.

DETAILED DESCRIPTION

Figure 2A:
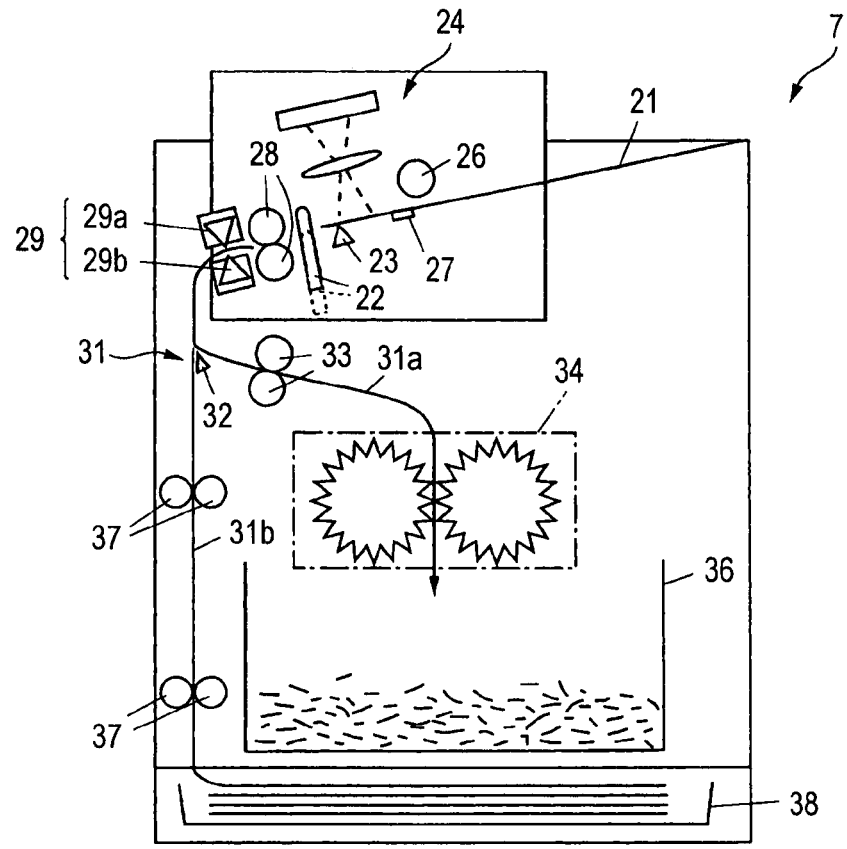
FIG. 2A is a general schematic representation and FIG. 2B is a plan view.

Referring now to the accompanying drawings, exemplary embodiments of the invention will be described. However, it is to be understood that the invention is not limited to the exemplary embodiments described below.

In the following description with the accompanying drawings, parts other than members required for the description are not shown for the purpose of easy understanding.

First Exemplary Embodiment

FIG. 1 is a general schematic representation of a document administration system according to a first exemplary embodiment of the invention.

In FIG. 1, a document administration system S of the first exemplary embodiment has a network N as an example of communication lines containing an Internet line 1 and a local area network (LAN) 2. The local area network 2 is connected to the Internet line 1 through a router R. In the first exemplary embodiment, connected to the local area network 2 are a destruction operator terminal 3 used by a destruction operator, an administrator terminal 4 used by an administrator of the document administration system S, a certification party terminal 6 used by a certification party requiring certification of confirmation of destruction in an audit or the like, a document destruction apparatus 7 for destructing a document, an image forming apparatus 8 capable of printing image information, and a document administration information server 9 as an example of an administration apparatus for managing document administration information of each document managed in the document administration system S. These components can mutually transmit and receive information to and from each other.

A time authentication terminal 11 of a time certificate authority for providing precise time information to conduct time authentication is connected to the Internet line 1. A public key providing terminal 12 for providing public key information that is used in encryption or decryption when information is transmitted to/received from a user such as the destruction operator, the administrator, the certification party and the document destruction apparatus 7. A known time stamp agency may be used as the time certificate authority. A known public key server of a certification organization may be used as the public key providing terminal 12.

Each of the terminals 3, 4, and 6 and the document administration information server 9 is implemented as a computer and includes a computer main body H1, a display H2, input units such as a keyboard H3, a mouse H4, etc., an HD drive (hard disk drive) (not shown), a CD drive (compact disk drive) (not shown), etc. Basic software (operating system) for controlling the basic operation of the computer, application programs of document creation software, drawing software, e-mail transmission and reception software, etc., a driver as an example of software for controlling the image forming apparatus 8, and the like are built in each of the terminals 3, 4, and 6 and the document administration information server 9.

The image forming apparatus 8 has plural paper feed cassettes 8a for feeding print paper and a paper ejection tray 8b to which print paper is ejected. As the image forming apparatus 8, a known electrophotographic multifunction processing machine having the functions of a printer, a facsimile, a network scanner, and a copier (for example, refer to JP 2004-287297 A) may be used and any of various image forming apparatus may be adopted.

Figure 2B:
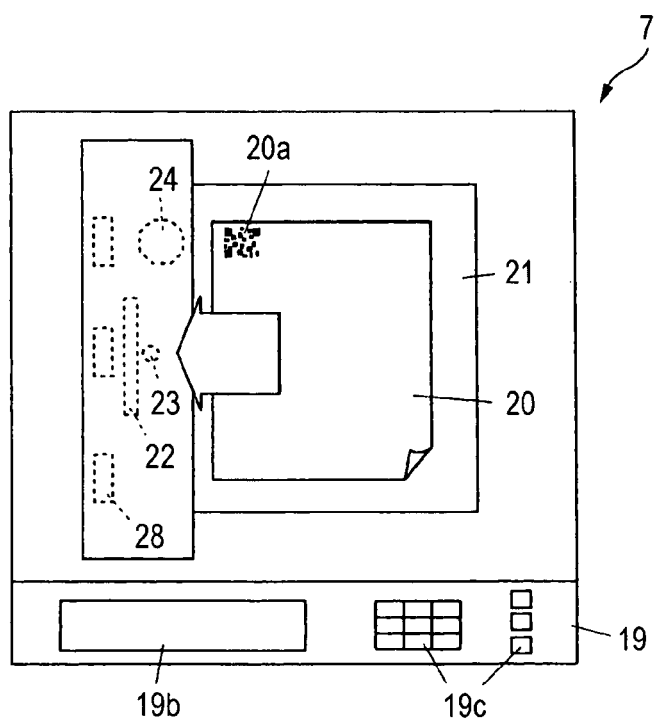

FIG. 2 is a schematic representation of the document destruction apparatus according to the first exemplary embodiment. FIG. 2A is a general schematic representation and FIG. 2B is a plan view.

In FIGS. 1 and 2, an input member 19 of the document destruction apparatus 7 for an operator to input is supported on its front face. The input member 19 is provided with a card insertion slot 19a into which an IC card as an example of an authentication information storage member for user authentication is inserted for read, a display section 19b, input buttons 19c, etc. The document destruction apparatus 7 has on its top a destruction document storage section 21 for storing a document 20 to be destructed. The destruction document storage section 21 is formed slantingly downward toward the downstream side in a paper transport direction. A paper abutment section 22 against which a leading end of the document to be destructed abuts is supported in the lower end part of the destruction document storage section 21. The paper abutment section 22 can be moved between a projection position (see the solid line in FIG. 2) at which the paper abutment section 22 projects upward above the top face of the destruction document storage section 21 and is abutted with the leading end of the document and a transport position (see the dashed line in FIG. 2) at which the paper abutment section 22 moves downward below the top face of the destruction document storage section 21 for allowing the document to be transported.

A paper sensor 23 as an example of a paper detection member for detecting the document being inserted up to the paper abutment section 22 is supported on an upstream side of the paper abutment section 22 in the paper transport direction. An identification image reader 24 for reading a document identification image 20a assigned to the document 20 to be destructed is placed above the paper sensor 23. The document administration system S of the first exemplary embodiment may adopt a known two-dimensional code as the document identification image 20a and use an optical system or a code reader for reading the document identification image 20a as the identification image reader 24.

A paper feed member 26 for coming in contact with the top face of the document stored in the destruction document storage section 21, rotating, and feeding the destruction document 20 is placed on the upstream side of the identification image reader 24 in the paper transport direction. The paper feed member 26 of the first exemplary embodiment can be moved up and down and can be brought into and out of contact with the top face of the document.

A handling member 27 for separating the destruction document 20 into one sheet if the destruction document 20 is made up of plural sheets is supported on the top face of the destruction document storage section 21 below the paper feed member 26. The handling member 27 of the first exemplary embodiment is implemented as a pad-like handling pad as an example of a handling member.

A transport member 28 for transporting the document to be destructed is supported on a downstream side of the paper abutment section 22 in the paper transport direction. A document reader 29 for reading the image of the document to be destructed is supported on the downstream side of the transport member 28 in the paper transport direction. The document reader 29 of the first exemplary embodiment has a pair of upper and lower document readers 29a and 29b so as to be able to read both the front and rear faces of the document to be destructed at once. Each of the document readers 29a and 29b of the first exemplary embodiment may be implemented as a known scanner.

A paper transport passage 31 is formed below the document reader 29. The paper transport passage 31 has a destruction document transport passage 31a where a document to be shredded and destructed is transported and a non-destruction document transport passage 31b where a document not to be destructed is transported. A branch guide member 32 for guiding a document into either of the destruction document transport passage 31a and the non-destruction document transport passage 31b is placed in a branch part between the destruction document transport passage 31a and the non-destruction document transport passage 31b.

The destruction document 20 transported to the destruction document transport passage 31a is transported by a destruction transport member 33, is shredded by a shredder 34 as an example of a document destruction member, and is stored in a destruction document storage vessel 36 for destruction.

The document 20 transported to the non-destruction document transport passage 31b is transported by a non-destruction transport member 37 and is stored in a non-destruction document storage vessel 38 for collection. The non-destruction document storage vessel 38 of the first exemplary embodiment is a vessel to which the document not to be destructed is transported for storage when it is attempted to destruct a document not to be destructed. The non-destruction document storage vessel 38 is locked with a locking device (not shown) and can be unlocked only by an authorized administrator.

(Description of Control Section of First Exemplary Embodiment)
(Description of Control Section of Administration Apparatus)

Figure 3:
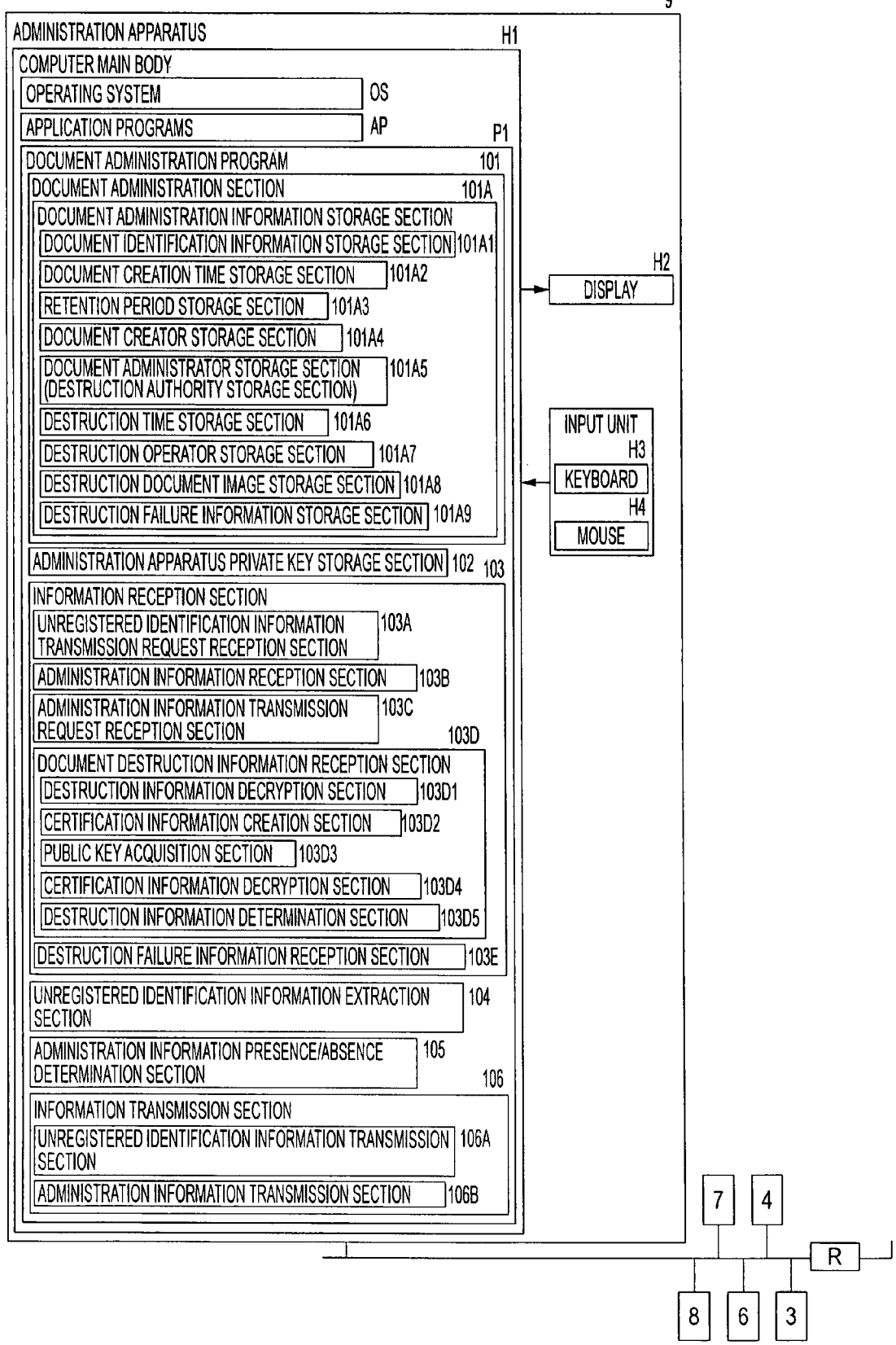
FIG. 3 is a block diagram (functional block diagram) to show functions of a control portion of an administration apparatus according to the first exemplary embodiment of the invention.

FIG. 3 is a block diagram (functional block diagram) to show functions of control portions of the administration apparatus of the first exemplary embodiment.

In FIG. 3, the computer main body H1 of the administration apparatus 9 has an I/O (input/output interface) for inputting/outputting an external signal, adjusting the input/output signal level, ROM (read-only memory) storing programs, data, etc., for performing necessary processing, etc., RAM (random access memory) for temporarily storing necessary data, a CPU (central processing unit) for performing processing responsive to a program stored on a hard disk, the ROM, etc., a clock oscillator, etc.

The administration apparatus 9 may implement various functions by executing programs stored in the hard disk, the ROM, etc.

Basic software (operating system) OS for controlling the basic operation of the administration apparatus 9, application programs AP of document creation software, drawing software, etc., and a document administration program P1 are stored in the hard disk drive of the administration apparatus 9. The functions except the known operating system OS or application programs AP (controller) will be described below:

The document administration program P1 has a document administration section 101, an administration apparatus private key storage section 102, an information reception section 103, an unregistered identification information extraction section 104, an administration information presence/absence determination section 105, and an information transmission section 106. The document administration program P1 transmits and receives information to and from the terminals 3, 4, and 6, the document destruction apparatus 7, etc., connected to the network N and manages document creation, document destruction, etc.

The document administration section 101 has a document administration information storage section 101A and manages new registration, update, etc., of document information in response to information concerning document creation and destruction transmitted from the terminals 3, 4, and 6, the document destruction apparatus 7, etc.

FIG. 4 is a schematic representation of the document administration information of the first exemplary embodiment.

The document administration information storage section 101A has a document identification information storage section 101A1, a document creation time storage section 101A2, a retention period storage section 101A3, a document creator storage section 101A4, a document administrator storage section 101A5 as an example of a destruction authority storage section, a destruction time storage section 101A6, a destruction operator storage section 101A7, a destruction document image storage section 101A8, and a destruction failure information storage section 101A9. The document administration information storage section 101A stores document administration information for managing document creation and document destruction. In FIG. 4, stored in the storage section 101A1 to 101A9 as the document administration information stored in the document administration information storage section 101A of the first exemplary embodiment are a process ID which is an example of document identification information, document creation date which is an example of document creation time at which the document was created, a document retention period, a document creator ID which is an example of identification information of the document creator who creates the document, a document administrator ID which is an example of identification information of the administrator of the document, a document type indicating a type of a managed document, document image data which is an example of image information of the read document, document destruction date which is an example of document destruction time at which the document was destructed, a document destruction apparatus ID which is an example of destruction apparatus identification information for identifying the document destruction apparatus 7 which destructs the document, a document destruction operator ID which is an example of identification information of the document destruction operator who destructs the document, destruction document image data which is an example of image information of the destructed document, and destruction failure information which is information indicating document destruction failure. The destruction failure information of the first exemplary embodiment contains destruction failure ID which is an example of identification information of a destruction failure, destruction failure apparatus ID which is an example of identification information of the destruction apparatus which is used when destruction resulted in failure, and destruction failure date which is an example of destruction failure time at which destruction resulted in failure. In the first exemplary embodiment, each user who uses the document administration system S (destruction operator, administrator, certification party, etc.,) is assigned a unique three-digit ID as identification information. The first digit of the ID is set larger in response to the stronger authority of the user. That is, an authority of a user having ID "2xx" in the document administration system S is set stronger than that of a user having ID "1xx."

The administration apparatus private key storage section 102 stores a private key unique to the administration apparatus 9. The private key of the administration apparatus 9 in the first exemplary embodiment is used to conduct known encryption communications and is used when information is encrypted and decrypted so as to prevent falsification, etc., in transmitting and receiving the information.

The information reception section 103 has an unregistered identification information transmission request reception section 103A, an administration information reception section 103B, an administration information transmission request reception section 103C, a document destruction information reception section 103D, and a destruction failure information reception section 103E. The information reception section 103 receives information transmitted from each component connected to the network N.

The unregistered identification information transmission request reception section 103A receives an unregistered identification information transmission request transmitted from each of the terminals 3, 4, and 6 when a document to be managed is created.

The administration information reception section 103B receives administration information of a document newly created in each of the terminals 3, 4, and 6. The administration information reception section 103B of the first exemplary embodiment receives administration information for new registration that contains a process ID, document creation date, a document retention period, a document creator ID, and a document administrator ID as the administration information.

The administration information transmission request reception section 103C receives an administration information transmission request transmitted from each of the terminals 3, 4, and 6 to check administration information before document destruction.

The document destruction information reception section 103D has a destruction information decryption section 103D1, a certification information creation section 103D2, a public key acquisition section 103D3, a certification information decryption section 103D4, and a destruction information determination section 103D5. The document destruction information reception section 103D receives document destruction information concerning document destruction transmitted from the document destruction apparatus 7. The document destruction information reception section 103D of the first exemplary embodiment receives destruction information that contains document destruction date, a document destruction apparatus ID, a document destruction operator ID, and destruction document image data (if such data is present). The document destruction information reception section 103D of the first exemplary embodiment also receives destruction information encrypted with the public key which corresponds to the private key of the administration apparatus 9, which is provided by the public key providing terminal 12 and which has a digital signature to which a digital signature as an example of an electronic signature provided by encrypting certification information based on the destruction information with the private key of the document destruction apparatus 7 is added.

The destruction information decryption section 103D1 decrypts, with the private key of the administration apparatus 9, the destruction information contained in a digital-signature-attached destruction information which is an example of received destruction information with an electronic signature.

The certification information creation section 103D2 creates certification information from the decrypted destruction information. The certification information creation section 103D2 of the first exemplary embodiment computes and creates, using a known hash function, a hash value which is an example of the certification information.

The public key acquisition section 103D3 acquires, from the public key providing terminal 12, the public key of the document destruction apparatus 7 which is a transmission source of the destruction information.

The certification information decryption section 103D4 decrypts the digital signature contained in the digital-signature-attached destruction information using the acquired public key. That is, the digital signature of the hash value encrypted with the private key of the document destruction apparatus 7 in the document destruction apparatus 7 is decrypted and the hash value is acquired.

The destruction information determination section 103D5 determines as to whether or not the received destruction information is falsified. The destruction information determination section 103D5 of the first exemplary embodiment determines as to whether or not the hash value which is the certification information created by the certification information creation section 103D2 and the hash value acquired by the certification information decryption section 103D4 identical with each other, to thereby determine as to whether or not the received destruction information is falsified.

The destruction failure information reception section 103E receives the destruction failure information transmitted when document destruction resulted in failure in the document destruction apparatus 7.

The unregistered identification information extraction section 104 references the administration information and extracts an unregistered process ID of unregistered document identification information.

Upon reception of an administration information transmission request, the administration information presence/absence determination section 105 references the administration information and determines as to whether or not the administration information corresponding to the received process ID is registered.

The information transmission section 106 has an unregistered identification information transmission section 106A and an administration information transmission section 106B. The information transmission section 106 transmits information to each of the components 3 to 8 connected to the network N.

The unregistered identification information transmission section 106A transmits a process ID of unregistered identification information in response to an unregistered identification information transmission request.

The administration information transmission section 106B transmits administration information in response to an administration information transmission request if the corresponding process ID exists; if the corresponding process ID does not exist, the administration information transmission section 106B transmits information indicating that the corresponding process ID does not exist.

(Description of Control Section of Destruction Operator Terminal)

Figure 5:
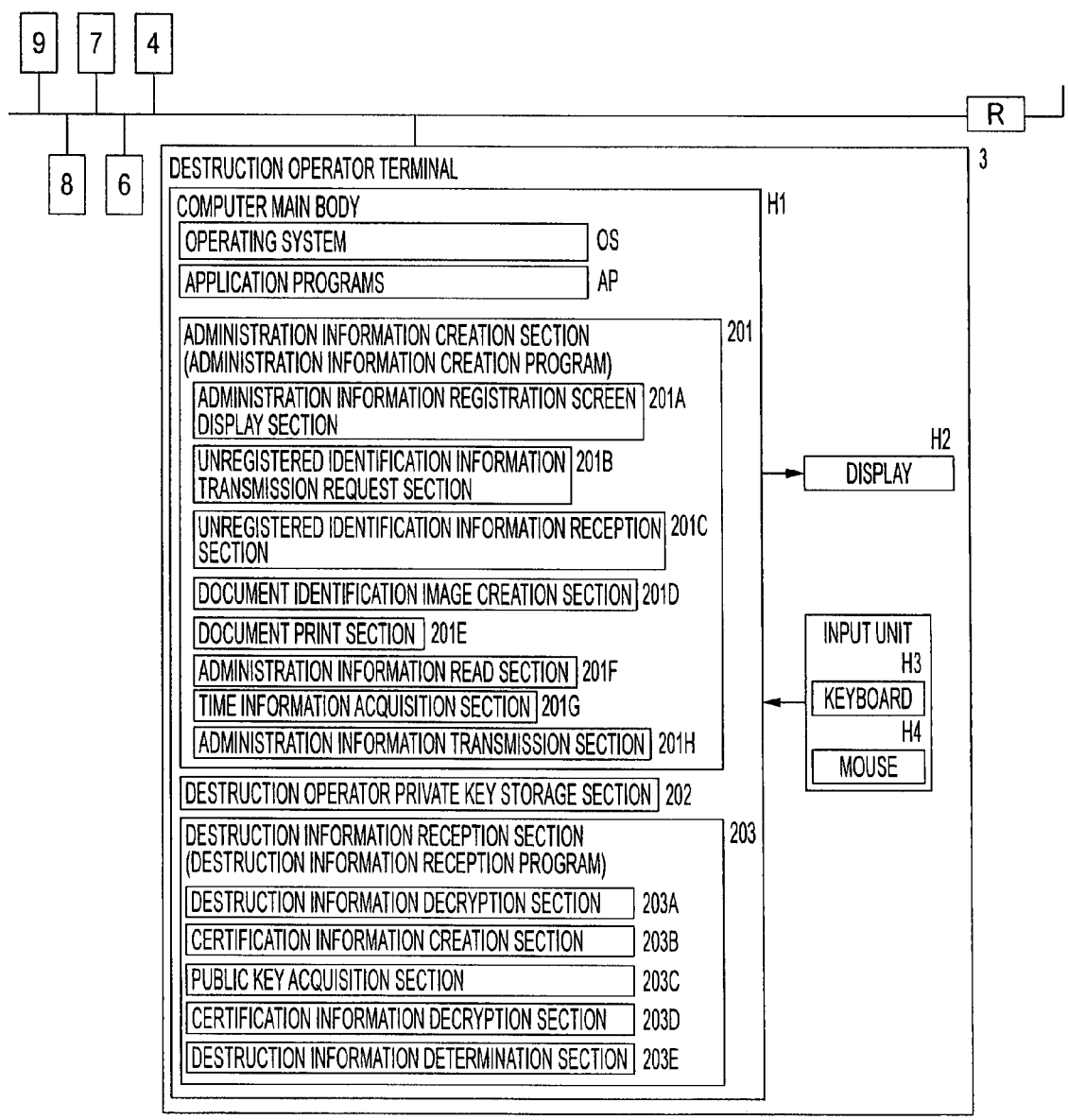
FIG. 5 is a block diagram (functional block diagram) to show functions of a control portion of a destruction operator terminal according to the first exemplary embodiment of the invention.

FIG. 5 is a block diagram (functional block diagram) to show functions of control portions of the destruction operator terminal according to the first exemplary embodiment.

In FIG. 5, the computer main body H1 of the destruction operator terminal 3 has an I/O (input/output interface) for inputting/outputting an external signal, adjusting the input/output signal level, ROM (read-only memory) storing programs, data, etc., for performing necessary processing, etc., RAM (random access memory) for temporarily storing necessary data, a CPU (central processing unit) for performing processing responsive to a program stored on a hard disk, the ROM, etc., a clock oscillator, etc.

The described destruction operator terminal 3 can implement various functions by executing the programs stored on the hard disk, the ROM, etc.

Basic software (operating system) OS for controlling the basic operation of the administration apparatus 9, application programs AP of document creation software, drawing software, etc., administration information creation section 201, destruction operator private key storage section 202, destruction information reception section 203, and the like are stored in the hard disk drive of the destruction operator terminal 3. The functions except the known operating system OS or application programs AP (controller) will be described below.

In the document administration system S of the first exemplary embodiment, each of other terminals 4 and 6 has a similar configuration to that of the destruction operator terminal 3. Therefore, the terminals 4 and 6 will not be discussed in detail and details of the terminals 4 and 6 will not be shown in the drawings.

The administration information creation section 201 of the destruction operator terminal 3 of the first exemplary embodiment has an administration information registration screen display section 201A, an unregistered identification information transmission request section 201B, an unregistered identification information reception section 201C, a document identification image creation section 201D, a document print section 201E, an administration information read section 201F, a time information acquisition section 201G, and an administration information transmission section 201H. The administration information creation section 201 prints a document newly managed in the document administration system S and creates administration information concerning the document.

FIG. 6 is a schematic representation of an administration information registration screen.

Figure 7B:
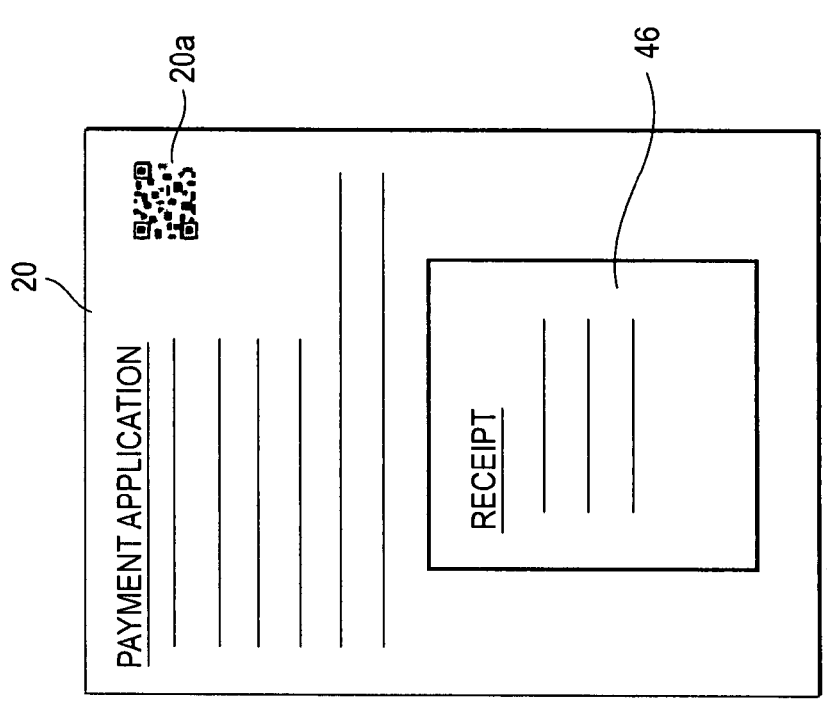
FIG. 7A is a schematic representation of a state before a receipt is attached and FIG. 7B is a schematic representation of a state after a receipt is attached.
Figure 7A:
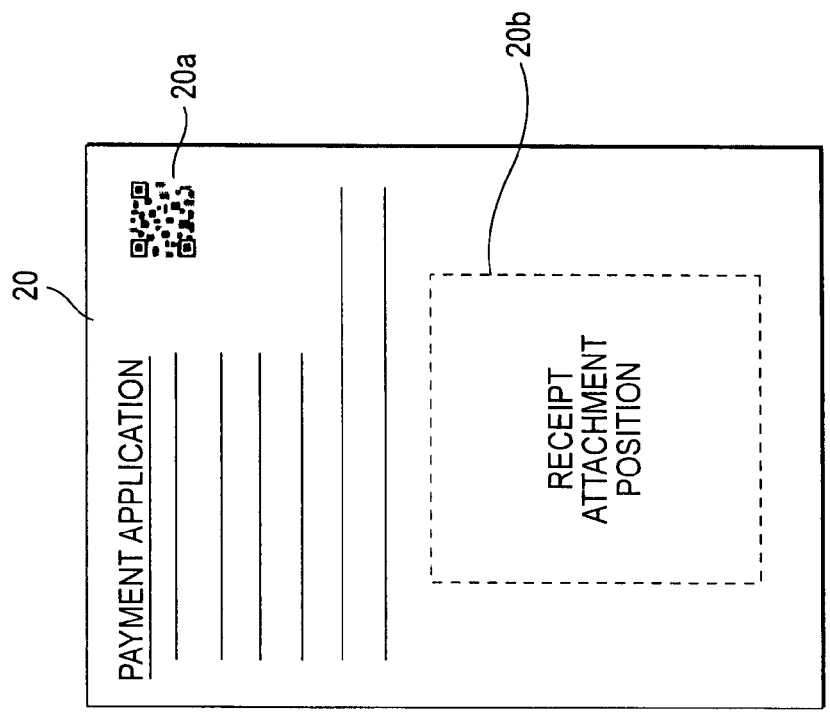

FIG. 7 is a schematic representation of an example of a receipt. FIG. 7A is a schematic representation of a state before a receipt is attached. FIG. 7B is a schematic representation of a state after a receipt is attached.

The administration information registration screen display section 201A displays on the display H2 an administration information new registration screen 41 (see FIG. 6) for the user of the terminal 3 having a possibility that he/she will become a destruction operator to create and register new administration information. In FIG. 6, the administration information new registration screen 41 has a process ID display field 41a for displaying a process ID which is an example of document identification information uniquely set for each managed document, a document administrator input field 41b for entering the administrator of the document to be created, a document creator input field 41c for displaying the destruction operator of the user of the terminal 3 who is the document creator creating the document, a document type setting field 41d for setting a type of the document to be created, a "print" icon 41e which is an example of a print command image to execute document print, and a "scan" icon 41f which is an example of a read start image to start reading an image of the managed document through the image reader of the image forming apparatus 8.

In the administration information new registration screen 41 of the first exemplary embodiment, an unregistered process ID in the administration information stored in the administration apparatus 9 is automatically displayed in the process ID display field 41a. The document creator ID is displayed in the document creator field 41c based on user information of the terminal 3, namely, login information of the terminal 3. In the document administration system S of the first exemplary embodiment, documents that can be created include a commercial business form whose retention period is 10 years, a receipt whose retention period is seven years, an order sheet whose retention period is five years, a technical report whose retention period is 10 years, a meeting minute whose retention period is one year, and other documents whose retention period can be set to "permanent" or "none" as shown in the document type setting field 41d. In FIG. 7, if the user selects receipt in the document type setting field 41d of the first exemplary embodiment, a document 20 having a receipt attachment field 20b shown in FIG. 7A is created. If the user enters the "scan" icon 41f in a state in which a receipt 46 is attached, the image reader of the image forming apparatus 8, namely, a network scanner reads it, to thereby input contents of the attached receipt 46 as the document image data.

The unregistered identification information transmission request section 201B transmits, to the administration apparatus 9, a transmission request of unregistered identification information which is the process ID for the newly registered document.

The unregistered identification information reception section 201C receives an unregistered process ID, which is unregistered identification information, transmitted from the administration apparatus 9.

The document identification image creation section 201D creates a document identification image 20a in accordance with the process ID printed on the document 20. The document identification image creation section 201D of the first exemplary embodiment creates a two-dimensional code which is an example of the document identification image 20a.

The document print section 201E transmits image information of the document to the image forming apparatus 8 for printing the document, in response to an input to the administration information new registration screen 41.

If the user selects the "scan" icon 41f in the administration information new registration screen 41, the administration information read section 201F reads administration information containing the image information of the document to be registered. The administration information read section 201F of the first exemplary embodiment acquire the read image data of a receipt from the image forming apparatus 8 connected through the network N, to thereby acquire the administration information.

The time information acquisition section 201G acquires the document creation time. The time information acquisition section 201G of the first exemplary embodiment transmits and receives information to and from the time authentication terminal 11 of the time certificate authority and acquires the precise document creation time. Specifically, the time information acquisition section 201G transmits the hash value of the administration information from the terminal 3. The time information acquisition section 201G receives encrypted information containing time information and a hash value returned from the time authentication terminal 11 in response to the transmission of the time information acquisition section 201G. The time information acquisition section 201G decrypts the encrypted information with the public key uniquely set for the time authentication terminal 11. Then, the time information acquisition section 201G makes a comparison between the decrypted hash value and the hash value of the administration information transmitted to the time authentication terminal 11, to thereby acquire the precise document creation time without being falsified.

The administration information transmission section 201H transmits newly created administration information to the administration apparatus 9.

The destruction operator private key storage section 202 stores a private key of the destruction operator uniquely set for each user having a possibility that he/she will become a destruction operator. The private key of the destruction operator in the first exemplary embodiment is used to conduct known encryption communications and is used when information is encrypted and decrypted so as to prevent falsification in transmitting/receiving information.

The destruction information reception section 203 has a destruction information decryption section 203A, a certification information creation section 203B, a public key acquisition section 203C, a certification information decryption section 203D, and a destruction information determination section 203E. The destruction information reception section 203 receives document destruction information concerning destruction of the document transmitted from the document destruction apparatus 7. The destruction information reception section 203 of the first exemplary embodiment receives destruction information containing the document destruction date, the document destruction apparatus ID, the document destruction operator, and additional information responsive to settings of the destruction operator (destruction document image data, etc.,). The destruction information reception section 203 of the first exemplary embodiment also receives digital-signature-attached destruction information. In the digital-signature-attached destruction information, the destruction information is encrypted with the public key which corresponds to the private key of the destruction operator and which is provided by the public key providing terminal 12. A digital signature provided by encrypting certification information, which is based on the destruction information, with the private key of the document destruction apparatus 7 is added to the digital-signature-attached destruction information.

The destruction information decryption section 203A decrypts the destruction information contained in the received digital-signature-attached destruction information, with the private key of the destruction operator.

The certification information creation section 203B creates certification information from the decrypted destruction information. The certification information creation section 203B of the first exemplary embodiment computes and creates a hash value which is an example of the certification information, using a known hash function.

The public key acquisition section 203C acquires, from the public key providing terminal 12, the public key of the document destruction apparatus 7 which is a transmission source of the destruction information.

The certification information decryption section 203D decrypts the digital signature contained in the digital-signature-attached destruction information, with the acquired public key. That is, the destruction apparatus 7 decrypts the digital signature which is the encrypted hash value, with the private key of the document destruction apparatus 7. Thereby, the hash value is acquired.

The destruction information determination section 203E determines as to whether or not the received destruction information is falsified. The destruction information determination section 203E of the first exemplary embodiment determines as to whether or not the hash value which is certification information created by the certification information creation section 203B and the hash value acquired by the certification information decryption section 203D identical with each other, to thereby determine as to whether or not the received destruction information is falsified.

(Description of Control Section of Document Destruction Apparatus)

Figure 8:
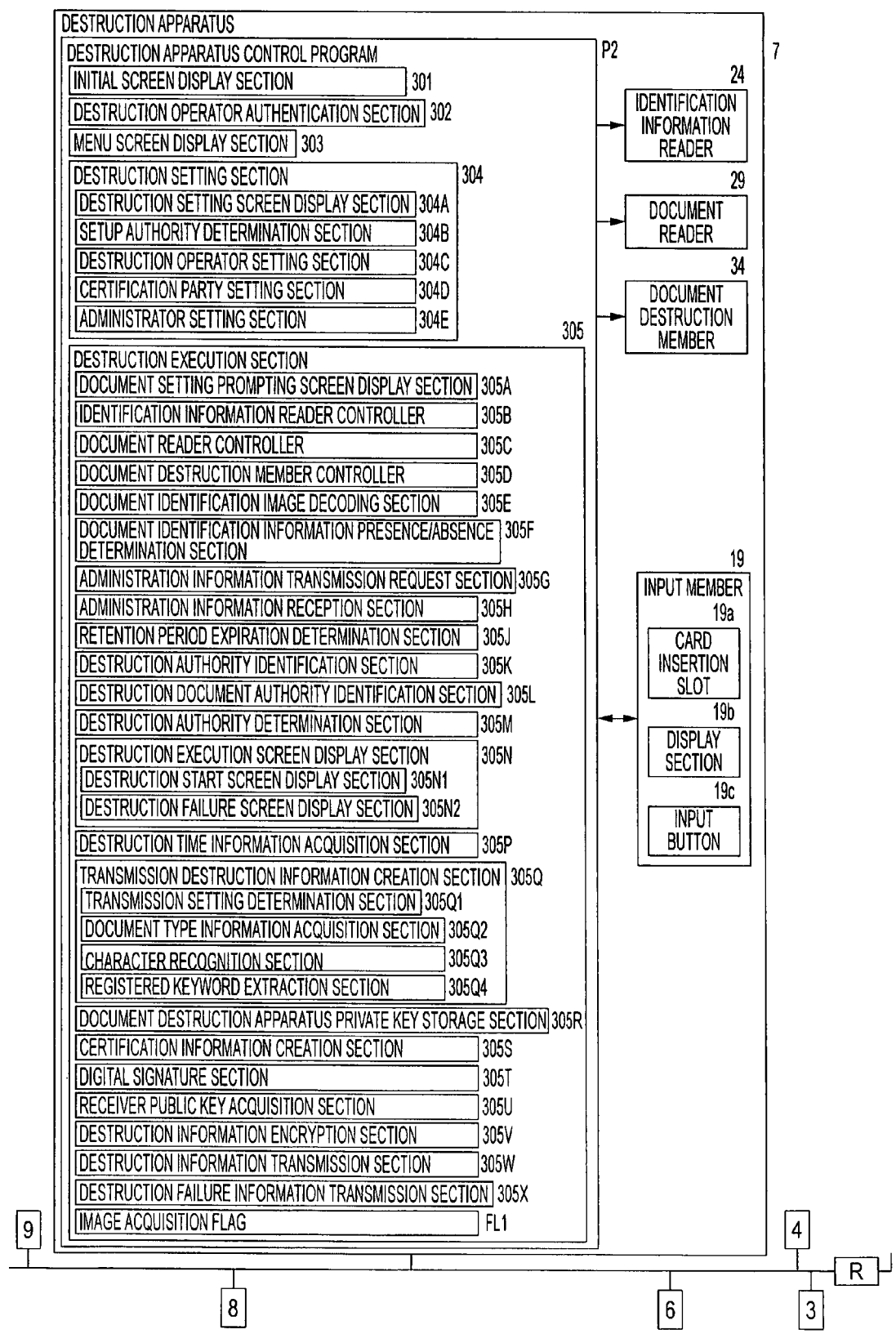
FIG. 8 is a block diagram (functional block diagram) to show functions of a control portion of the document destruction apparatus according to the first exemplary embodiment of the invention.

FIG. 8 is a block diagram (functional block diagram) to show functions of control portions of the document destruction apparatus of the first exemplary embodiment.

In FIG. 8, the document destruction apparatus 7 is implemented as a microcomputer having an I/O (input/output interface) for inputting/outputting an external signal, adjusting the input/output signal level, ROM (read-only memory) storing programs, data, etc., for performing necessary processing, etc., RAM (random access memory) for temporarily storing necessary data, a CPU (central processing unit) for performing processing responsive to a program stored on a hard disk, the ROM, etc., a clock oscillator, etc.

The described document destruction apparatus 7 can implement various functions by executing the programs stored on the hard disk, the ROM, etc.

The functions of a destruction apparatus control program P2 of the document destruction apparatus 7 (controller) will be described below.

Figure 9:
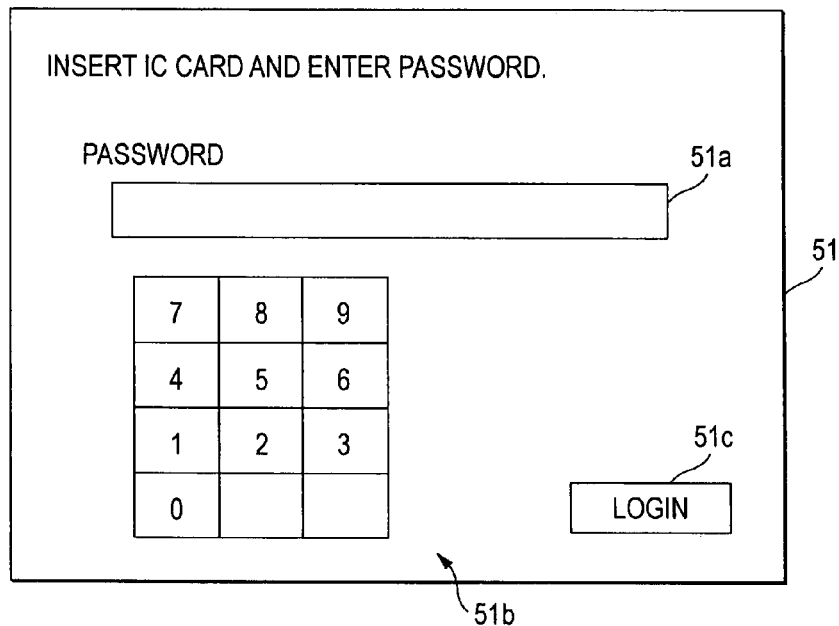
FIG. 9 is a schematic representation of an example of an initial screen of the document destruction apparatus according to the first exemplary embodiment of the invention.

FIG. 9 is a schematic representation of an example of an initial screen of the document destruction apparatus of the first exemplary embodiment.

An initial screen display section 301 of the destruction apparatus control program P2 displays, on the display section 19b of the input member 19, an initial screen 51 which is an example of an authentication screen of the document destruction apparatus 7 for user authentication (see FIG. 9). In FIG. 9, the initial screen 51 of the first exemplary embodiment has a password input field 51a, a password input screen 51b, and a "login" icon 51c which is an example of an authentication execution image for executing authentication of a user.

A destruction operator authentication section 302 authenticates the destruction operator who is a user of the document destruction apparatus 7 from the password entered in the password input field 51a of the initial screen 51 and the authentication information stored on the IC card inserted into the card insertion slot 19a. The destruction operator authentication section 302 of the first exemplary embodiment authenticates the destruction operator (the user) by making a comparison between the password entered in the password input field 51a and the password stored on and read from the IC card.

Figure 10:
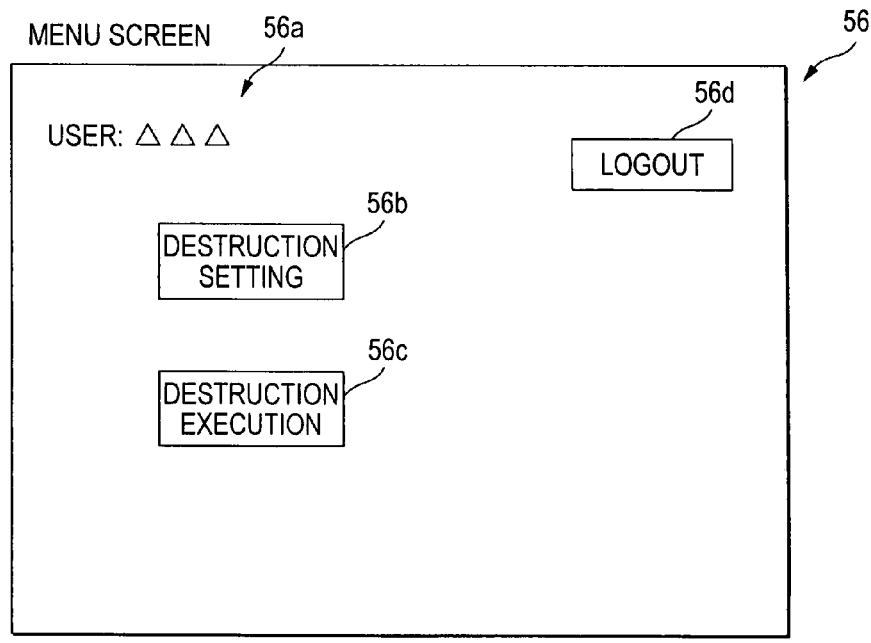
FIG. 10 is a schematic representation of an example of a menu screen of the document destruction apparatus according to the first exemplary embodiment of the invention.

FIG. 10 is a schematic representation of an example of a menu screen of the document destruction apparatus of the first exemplary embodiment.

In FIGS. 8 and 10, a menu screen display section 303 displays a menu screen 56 displaying a list of various types of operation of the document destruction apparatus 7 (see FIG. 10) on the display section 19b. In FIG. 10, the menu screen 56 of the first exemplary embodiment has a user display field 56a displaying the destruction operator name which is the authenticated user, a "destruction setting" icon 56b which is an example of a destruction setting image for making various settings when the document is destructed, a "destruction execution" icon 56c which is an example of a destruction execution image for executing destruction, and a "logout" icon 56d which is an example of a use quit image to quit use of the document destruction apparatus 7.

In FIG. 8, a destruction setting section 304 has a destruction setting screen display section 304A, a setup authority determination section 304B, a destruction operator setting section 304C, a certification party setting section 304D, and an administrator setting section 304E. The destruction setting section 304 makes various settings when the document is destructed in response to user's input.

Figure 11:
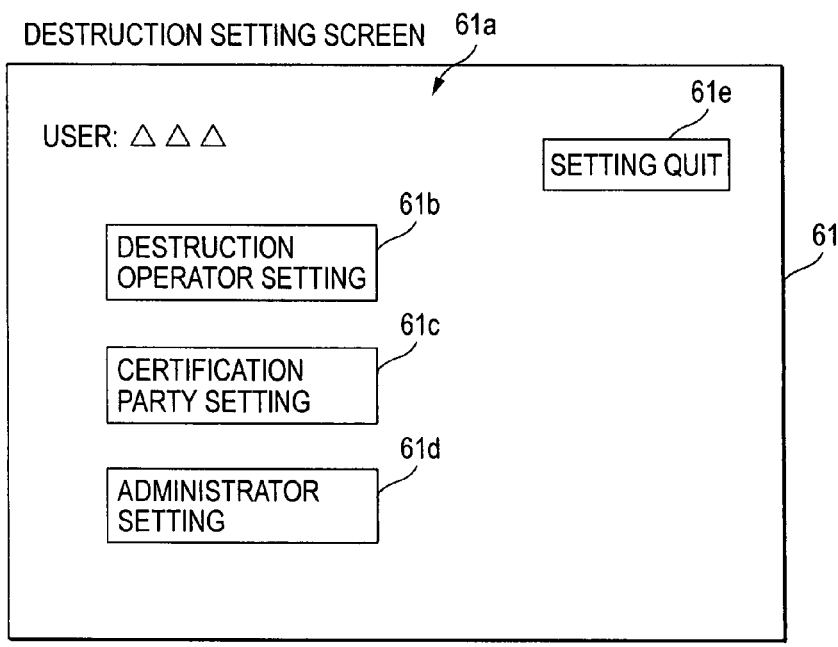
FIG. 11 is a schematic representation of an example of a destruction setting screen according to the first exemplary embodiment of the invention.

FIG. 11 is a schematic representation of an example of a destruction setting screen of the first exemplary embodiment.

The destruction setting screen display section 304A displays, on the display section 19b, a destruction setting screen 61 (see FIG. 11) to select a receiver who makes destruction setting. The receiver is an example of a transmission target to whom destruction information concerning the destruction document is transmitted when the document is destructed. In FIG. 11, the destruction setting screen 61 has a destruction operator display field 61a displaying the destruction operator name, a "destruction operator setting" icon 61b which an example of a destruction operator setting start image to make setting concerning the destruction operator, a "certification party setting" icon 61c which is an example of a certification party setting start image to make setting concerning the certification party to certify destruction, a "administrator setting" icon 61d which is an example of an administrator setting start image to make setting concerning the administrator of the document to be destructed, and a "setting quit" icon 61e to quit the setting.

The setup authority determination section 304B determines as to whether or not the authenticated destruction operator has authority of changing and registering the setting for each receiver. For example, if the ID of the user is "3xx" or more, the setup authority determination section 304B of the first exemplary embodiment determines, based on the authentication information stored on the IC card, that the user has the authority of setting the certification party; and if the ID of the user is "5xx" or more, determines that the user has the authority of setting the administrator.

Figure 12:
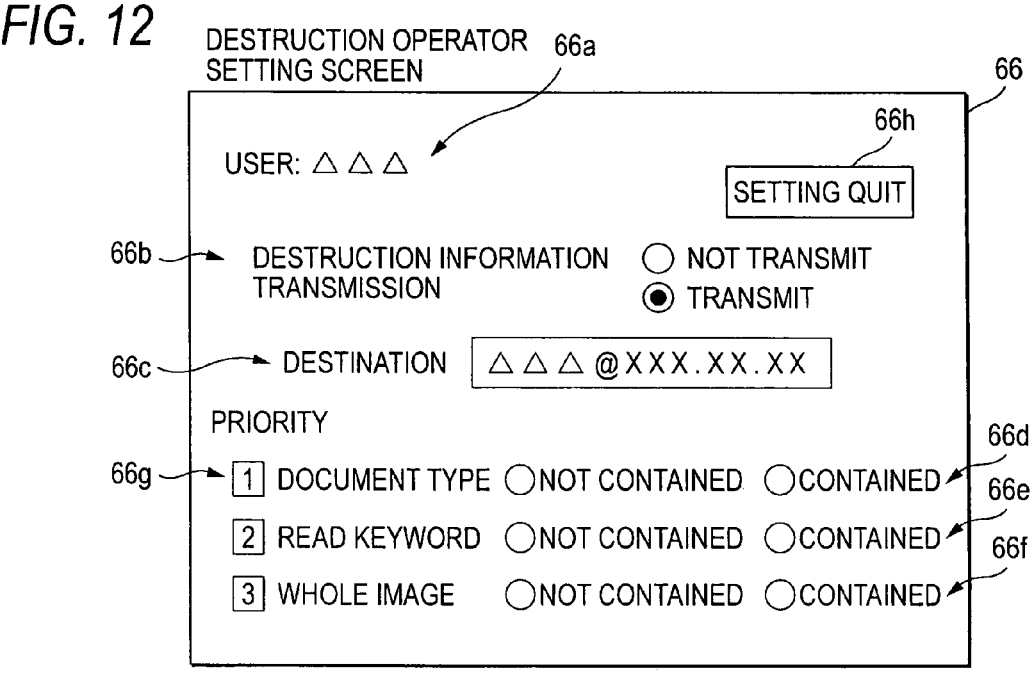
FIG. 12 is a schematic representation of an example of a destruction operator setting screen according to the first exemplary embodiment of the invention.

FIG. 12 is a schematic representation of an example of a destruction operator setting screen of the first exemplary embodiment.

The destruction operator setting section 304C sets transmission of destruction information concerning the destruction operator in response to an input in the input member 19 by the user. The destruction operator setting section 304C of the first exemplary embodiment displays a destruction operator setting screen 66 as shown in FIG. 12 on the display section 19b and stores the setting in accordance with a user's input. In FIG. 12, the destruction operator setting screen 66 has a destruction operator display field 66a displaying the destruction operator name, a destruction information transmission presence/absence setting field 66b to specify as to whether or not destruction information is to be transmitted to the terminal of the destruction operator, a destination input field 66c to set the destination, a document type presence/absence setting field 66d to specify as to whether or not document type information is to be contained in the destruction information, a keyword presence/absence setting field 66e to specify as to whether or not a read keyword which is read text information is to be contained in the destruction information, a whole image presence/absence setting field 66f to specify as to whether or not the whole image of the destructed document is to be contained in the destruction information, a priority setting field 66g to set the transmission priority of the document type, the read keyword and the whole image, and a "setting quit" icon 66h which is an example of a setting quit image to quit the setting. In the first exemplary embodiment, the user enters the destination and the priority by pressing the input buttons 19c of the input member 19. Setting is made so that any one of the document type, the read keyword and the whole image is contained in the destruction information of the first exemplary embodiment.

The certification party setting section 304D sets transmission of the destruction information concerning the certification party in accordance with the input to the input member 19 by the user. In the certification party setting section 304D, the destruction operator in the destruction operator setting screen 66 shown in FIG. 12 is replaced with a certification party and a similar screen is displayed. Setting is made in a similar manner. Therefore, image illustration and detailed description are omitted.

The administrator setting section 304E sets transmission of the destruction information concerning the administrator in accordance with an input to the input member 19 by the user. In the administrator setting section 304E, the destruction operator in the destruction operator setting screen 66 shown in FIG. 12 is replaced with the administrator. A similar image is displayed. Setting is made in a similar manner. Therefore, image illustration and detailed description are omitted.

In FIG. 8, a destruction execution section 305 has sections 305A to 305X and an image acquisition flag FL1. The destruction execution section 305 executes document destruction in accordance with an input of the destruction operator.

Figure 13:
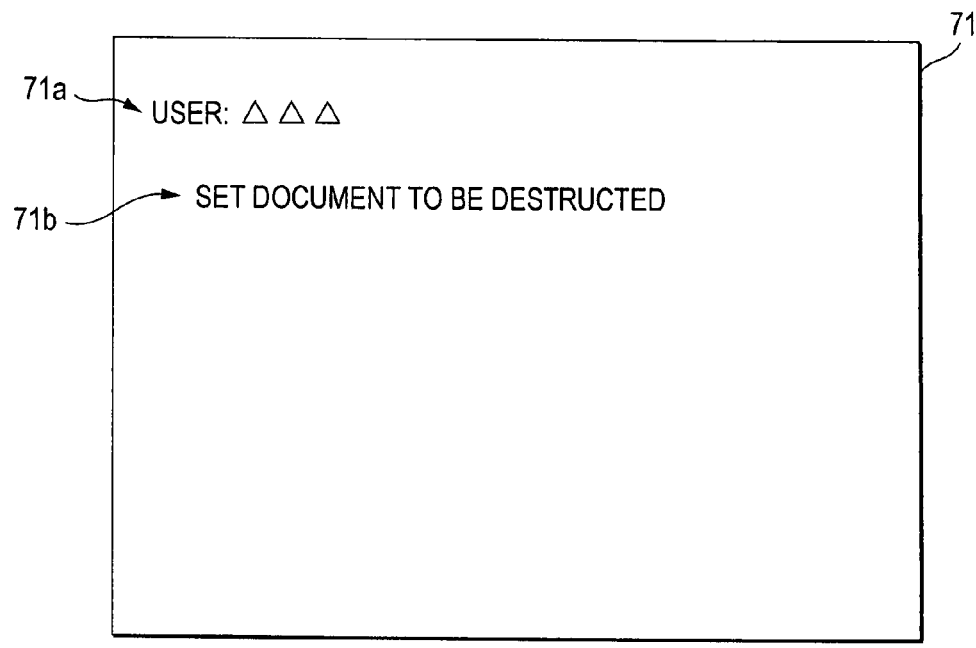
FIG. 13 is a schematic representation of an example of a screen which prompts to set a document, according to the first exemplary embodiment of the invention.

FIG. 13 is a schematic representation of an example of a document setting prompting screen of the first exemplary embodiment.

A document setting prompting screen display section 305A displays, on the display section 19b, a document setting prompting screen 71 (see FIG. 13) for prompting the user to set (store) the document to be destructed in the destruction document storage section 21 when document destruction is executed. In FIG. 13, the document setting prompting screen 71 has a destruction operator display field 71a displaying the destruction operator name and a prompting screen 71b for prompting the user to set the document to be destructed.

An identification information reader controller 305B controls the identification image reader 24 to read document identification information assigned to the document stored in the destruction document storage section 21. In the embodiment, a two-dimensional code which is an identification image into which the process ID as document identification information is converted is read.

A document reader controller 305C controls the document reader 29 and the transport members 28, 33, and 37, etc., to read an image of the document to be destructed.

A document destruction member controller 305D controls the shredder 34 which is an example of a document destruction member to shred and destruct the document.

A document identification image decoding section 305E decrypts the two-dimensional code, which is an identification image, read by the identification image reader 24 to provide the process ID which is document identification information.

A document identification information presence/absence determination section 305F determines as to whether or not the image read by the identification image reader 24 contains document identification information. That is, the document identification information presence/absence determination section 305F determines as to whether or not document identification information is assigned to the document to be destructed.

If the process ID which is the document identification information can be acquired, an administration information transmission request section 305G transmits an administration information transmission request for transmitting administration information corresponding to the process ID, to the administration apparatus 9.

An administration information reception section 305H receives the administration information, which is transmitted from the administration apparatus 9 in response to the administration information transmission request.

A retention period expiration determination section 305J determines as to whether or not the retention period of the document to be destructed has expired based on the received administration information. The retention period expiration determination section 305J of the first exemplary embodiment determines as to whether or not the retention period has expired based on an internal clock (not shown) and retention period information contained in the administration information.

A destruction authority identification section 305K identifies the authority of the user who is the destruction operator. The destruction authority identification section 305K of the first exemplary embodiment identifies the authority based on the ID stored on the IC card inserted into the card insertion slot 19a, for example, "1xx," etc.

A destruction document authority identification section 305L identifies the destruction authority if the destruction authority is set for the document to be destructed based on the received administration information. The destruction document authority identification section 305L of the first exemplary embodiment identifies the authority based on the ID of the administrator, for example, "3xx" if the document administrator is set in the administration information.

A destruction authority determination section 305M determines as to whether or not the destruction operator has the authority of destructing the document. The destruction authority determination section 305M of the first exemplary embodiment determines as to whether or not a numeric value of the most significant digit of the ID of the destruction operator is equal to or greater than a numeric value of the most significant digit of the ID of the administrator, to thereby determine as to whether or not the destruction operator has the authority of destructing the document.

Figure 14:
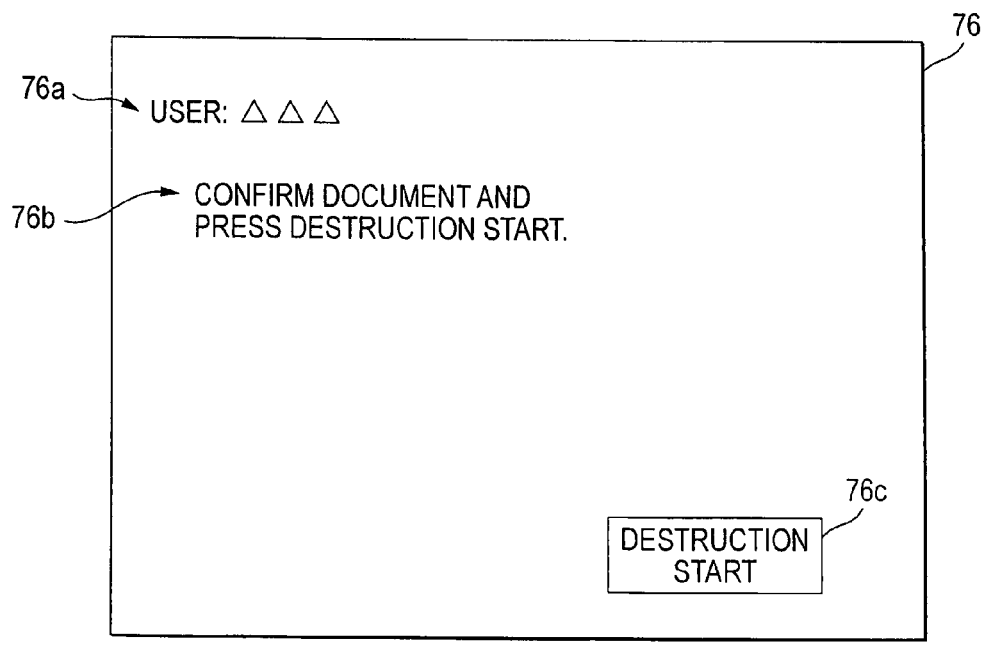
FIG. 14 is a schematic representation of a destruction start screen displayed at a time when destruction is started in the first exemplary embodiment of the invention.

FIG. 14 is a schematic representation of a destruction start screen displayed at the destruction starting time in the first exemplary embodiment.

A destruction execution screen display section 305N has a destruction start screen display section 305N1 and a destruction failure screen display section 305N2. The destruction execution screen display section 305N displays a screen on the display section 19b in accordance with each determination result.

The destruction start screen display section 305N1 displays a destruction start screen 76, shown in FIG. 14, to start destruction if destruction is executed according to the presence or absence of the process ID, the retention period, the authority, etc. In FIG. 14, the destruction start screen 76 has a destruction operator display field 76a displaying the destruction operator name, a final confirmation prompting screen 76b for prompting the destruction operator to make final confirmation of the document, and a "destruction start" icon 76c which is an example of a destruction start image to start destruction.

Figure 15:
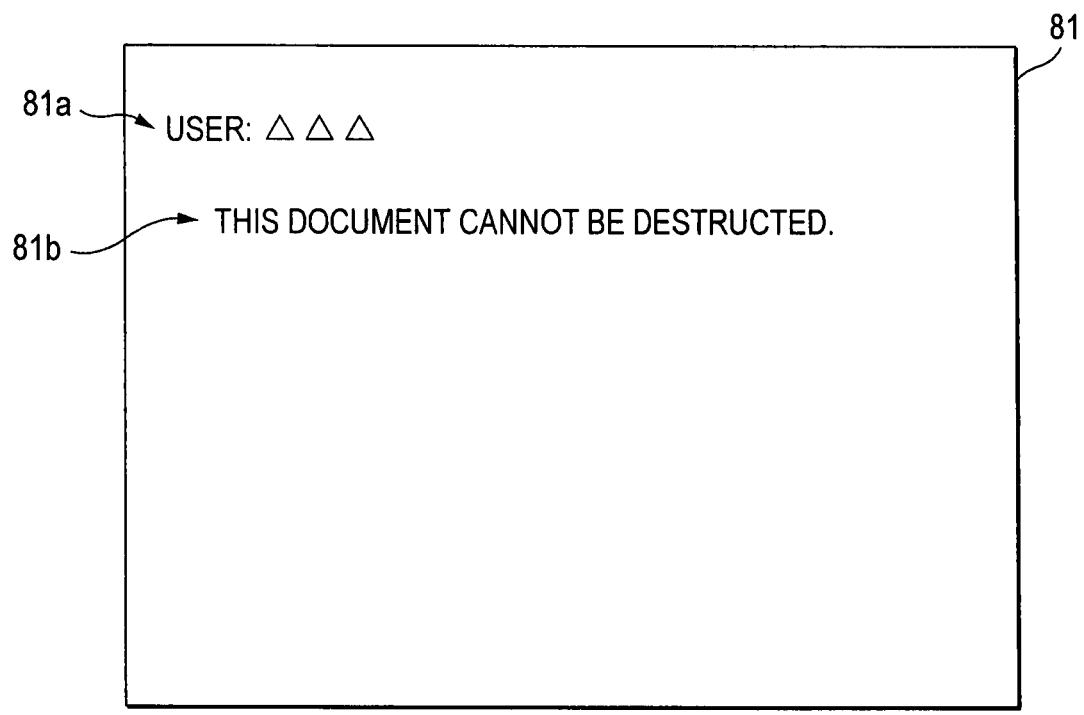
FIG. 15 is a schematic representation of an example of a destruction failure screen displayed when destruction ends in failure in the first exemplary embodiment of the invention.

FIG. 15 is a schematic representation of an example of a destruction failure screen displayed at the destruction failure time in the first exemplary embodiment.

A destruction failure screen display section 305N2 displays, on the display section 19b, a destruction failure screen 81 shown in FIG. 15 to inform destruction failure if the document is not permitted to be destructed and the destruction results in failure according to the presence or absence of the process ID, the retention period, the authority, etc. In FIG. 15, the destruction failure screen 81 has a destruction operator display field 81a displaying the destruction operator name and a destruction failure informing image 81b for informing that the document cannot be destructed.

A destruction time information acquisition section 305P acquires the document destruction time at which the document was destructed. Like the time information acquisition section 201G, the destruction time information acquisition section 305P of the first exemplary embodiment transmits and receives information to and from the time authentication terminal 11 of the time certificate authority and acquires the precise document destruction time. Specifically, the destruction time information acquisition section 305P transmits the hash value of destruction information from the document destruction apparatus 7. The destruction time information acquisition section 305P receives encrypted information containing time information and a hash value returned from the time authentication terminal 11 in response to the transmission of the destruction time information acquisition section 305P. The destruction time information acquisition section 305P decrypts the encrypted information with the public key of the time certificate authority. The destruction time information acquisition section 305P makes a comparison between the hash value and the hash value of the administration information transmitted to the time authentication terminal 11, to thereby acquire the precise document destruction time without being falsified, etc.

A transmission destruction information creation section 305Q has a transmission setting determination section 305Q1, a document type information acquisition section 305Q2, a character recognition section 305Q3, and a registered keyword extraction section 305Q4. The transmission destruction information creation section 305Q creates destruction information to be transmitted to the administration apparatus 9 and destruction information to be transmitted to the terminal 3, 4, 6 in accordance with settings. If destruction results in failure, the transmission destruction information creation section 305Q of the first exemplary embodiment creates destruction failure information instead of the destruction information. In the first exemplary embodiment, as the destruction information or the destruction failure information to be transmitted to the administration apparatus 9, information in a predetermined format to update administration information is created. Further, as the destruction information to be transmitted to the terminal 3, 4, 6, information in the known e-mail format is created and may be used as information to check the destruction information concerning the destructed document.

The transmission setting determination section 305Q1 determines the destruction setting made in the destruction setting section 304 and determines the presence or absence of transmission of destruction information, the presence or absence of image read, etc.

The document type information acquisition section 305Q2 acquires the document type (commercial business form, receipt, etc.,) based on the administration information.

To extract a preset specific keyword contained in the document to be destructed, the character recognition section 305Q3 executes a character recognition process for the read document image. As the character recognition process, a known OCR (optical character reader) process may be adopted.

If the process ID cannot be read from the destruction document or if no process ID is assigned to the destruction document, the registered keyword extraction section 305Q4 determines as to whether or not the image information of the destruction document which is subjected to a character recognition process contains a preset specific keyword. Therefore, for example, if a keyword of "receipt" or the like is extracted from the image information, the document type can be determined "receipt." If a keyword of "technical report" or the like is extracted, the document type can be determined "technical report."

A document destruction apparatus private key storage section 305R stores information of a private key of the document destruction apparatus which is uniquely set for the document destruction apparatus 7. The private key of the document destruction apparatus of the first exemplary embodiment is used to conduct known encryption communications and is used when information is encrypted and decrypted so as to prevent falsification, etc., in transmitting and receiving information.

A certification information creation section 305S creates certification information from the created destruction information. The certification information creation section 305S of the first exemplary embodiment computes and creates a hash value which is an example of the certification information, using a known hash function like the certification information creation section 203B.

A digital signature section 305T is an example of an electronic signature section and encrypts the hash value, which is an example of the certification information, with the private key of the document destruction apparatus, to thereby create digital signature information to certify that information has been created in the document destruction apparatus 7.

A receiver public key acquisition section 305U acquires the public key for the receiver in accordance with the destination to which destruction information is encrypted and transmitted from the public key providing terminal 12.

A destruction information encryption section 305V encrypts the created destruction information with the acquired receiver public key to create encrypted destruction information.

A destruction information transmission section 305W transmits encrypted destruction information with digital signature provided by adding a digital signature to the created destruction information to the transmission target.

A destruction failure information transmission section 305X transmits the created destruction failure information to the transmission target.

An image acquisition flag FL1 has an initial value of "0." If it is determined that the image information of the document to be destructed is to be acquired, the image acquisition flag FL1 is set to "1." If it is not necessary to acquire the image information, the image acquisition flag FL1 is set to "0."

(Description of Flowcharts of First Exemplary Embodiment)

Next, process flows of the administration apparatus 9, the destruction operator terminal 3, and the document destruction apparatus 7 of the document administration system S of the first exemplary embodiment will be described with reference to flowcharts. A process for the image forming apparatus 8 to execute print in accordance with the received image information, a process of receiving destruction information by e-mail in the terminals 3, 4, and 6, and a process of the time authentication terminal 11, the public key providing terminal 12, etc., are known. Therefore, illustration and detailed description thereon will be omitted.

(Description of Flowchart of Destruction Operator Terminal 3)

Figure 16:
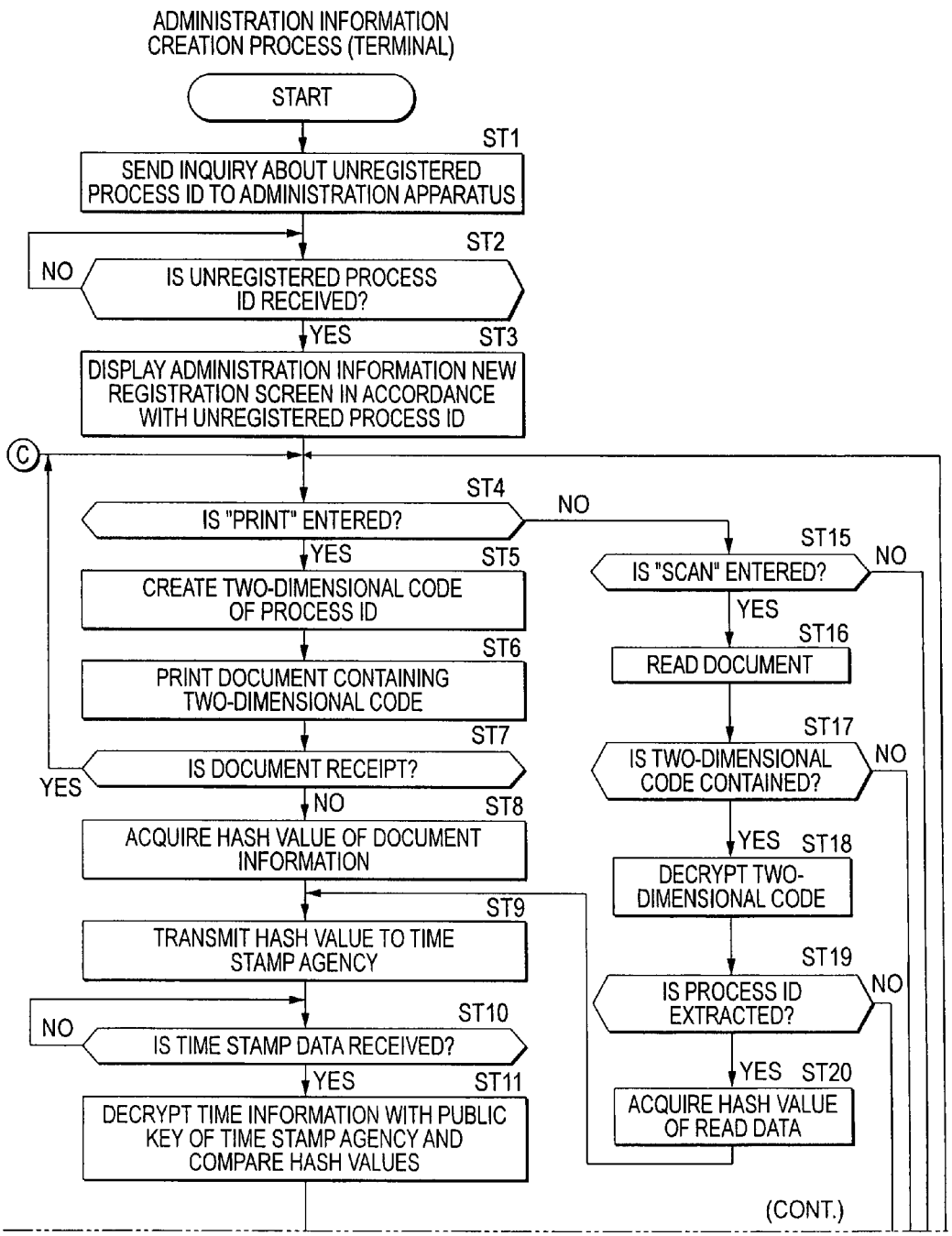
FIG. 16 is a flowchart of a process of generating administration information in the destruction operator terminal according to the first exemplary embodiment of the invention.

FIG. 16 is a flowchart of an administration information creation process in the destruction operator terminal of the first exemplary embodiment.

Steps (ST) of the flowchart in FIG. 16 are executed in accordance with the administration information creation section 201 as an administration information creation program stored on the hard disk, etc., of the computer main body H1. This process is executed as multitasks concurrently with other various types of processing of the destruction operator terminal 3.

The flowchart in FIG. 16 is started when the administration information creation program is started in the destruction operator terminal 3.

Administration information creation programs of the administrator terminal 4 and the certification party terminal 6 are similar to the administration information creation program of the destruction operator terminal 3 and therefore detailed description and illustration are omitted.

At ST1 in FIG. 16, an inquiry about an unregistered process ID, namely, a transmission request of an unregistered process ID is sent to the administration apparatus 9. Then, the process goes to ST2.

At ST2, whether or not the unregistered process ID transmitted from the administration apparatus 9 is received. If the determination is yes (Y), the process goes to ST3; if the determination is no (N), ST2 is repeated.

At ST3, an administration information new registration screen 41 is displayed on the display H2 in accordance with the unregistered process ID, user information, etc. The process goes to ST4.

At ST4, whether or not the user enters selection of the "print" icon 41e in the administration information new registration screen 41 is determined. If the determination is yes (Y), the process goes to ST5; if the determination is no (N), the process goes to ST15.

At ST5, a process ID identification image is created. That is, the process ID is converted into the two-dimensional code 20a. The process goes to ST6.

At ST6, a document 20 containing the two-dimensional code 20a is printed. That is, the image of the document is transmitted to the image forming apparatus 8. The process goes to ST7.

At ST7, whether or not a document type is receipt is determined. If the determination is yes (Y), the process returns to ST4; if the determination is no (N), the process goes to ST8.

At ST8, a hash value which is certification information of printed document information is acquired. The process goes to ST9.

At ST9, the hash value is transmitted to the time stamp agency which is a time authentication agency. The process goes to ST10.

At ST10, whether or not time stamp data which is an example of time information transmitted from the time stamp agency is received is determined. If the determination is yes (Y), the process returns to ST11; if the determination is no (N), ST10 is repeated.

At ST11, the received encrypted time information is decrypted with the public key of the time stamp agency and is compared with the transmitted hash value. The process goes to ST12.

At ST12, whether or not the hash values are identical with each other is determined. If the determination is yes (Y), the process goes to ST13; if the determination is no (N), the process goes to ST21.

At ST13, the date of the retention period until which retention is required is calculated from (i) the document creation date, which is based on the received time information, and (ii) the information of the document type or (iii) the retention period set in the administration information new registration screen 41. The process goes to ST14.

At ST14, administration information containing the process ID, the document type, the document creation date, the document creator, the retention period, etc., registered in the administration information new registration screen 41 is transmitted to the administration apparatus 9. The process returns to ST4.

At ST15, whether or not the user presses the "scan" icon 41f in the administration information new registration screen 41 is determined. If the determination is yes (Y), the process goes to ST16; if the determination is no (N), the process goes to ST23.

At ST16, the read target document 20 with a receipt 46 attached thereon is read. That is, the image information read by the image forming apparatus 8 is acquired. The process goes to ST17.

At ST17, whether or not a two-dimensional code is added to the read document is determined. If the determination is yes (Y), the process goes to ST18; if the determination is no (N), the process goes to ST21.

At ST18, the two-dimensional code is decrypted to acquire the process ID. The process goes to ST19.

At ST19, whether or not the process ID is extracted is determined. If the determination is yes (Y), the process goes to ST20; if the determination is no (N), the process goes to ST21.

At ST20, the image information of the read document, namely, the hash value of the read data is acquired. The process goes to ST9.

At ST21, an error display screen is displayed on the display H2 in accordance with the determination result. The process goes to ST22.

At ST22, whether or not the error is released, namely, whether or not the user checks contents of the error and makes some entry is determined. If the determination is yes (Y), the process goes to ST4; if the determination is no (N), ST22 is repeated.

At ST23, whether or not the user enters quit of the new registration of administration information is determined. If the determination is yes (Y), the administration information creation process in FIG. 16 is terminated; if the determination is no (N), the process goes to ST24.

At ST24, whether or not any other entry is made in the administration information new registration screen 41, for example, whether or not an entry in each field or the like is made is determined. If the determination is yes (Y), the process goes to ST25; if the determination is no (N), the process returns to ST4.

At ST25, the administration information new registration screen 41 is updated in response to the entry. The process returns to ST4.

(Description of Flowchart of Administration Apparatus 9)

Figure 17:
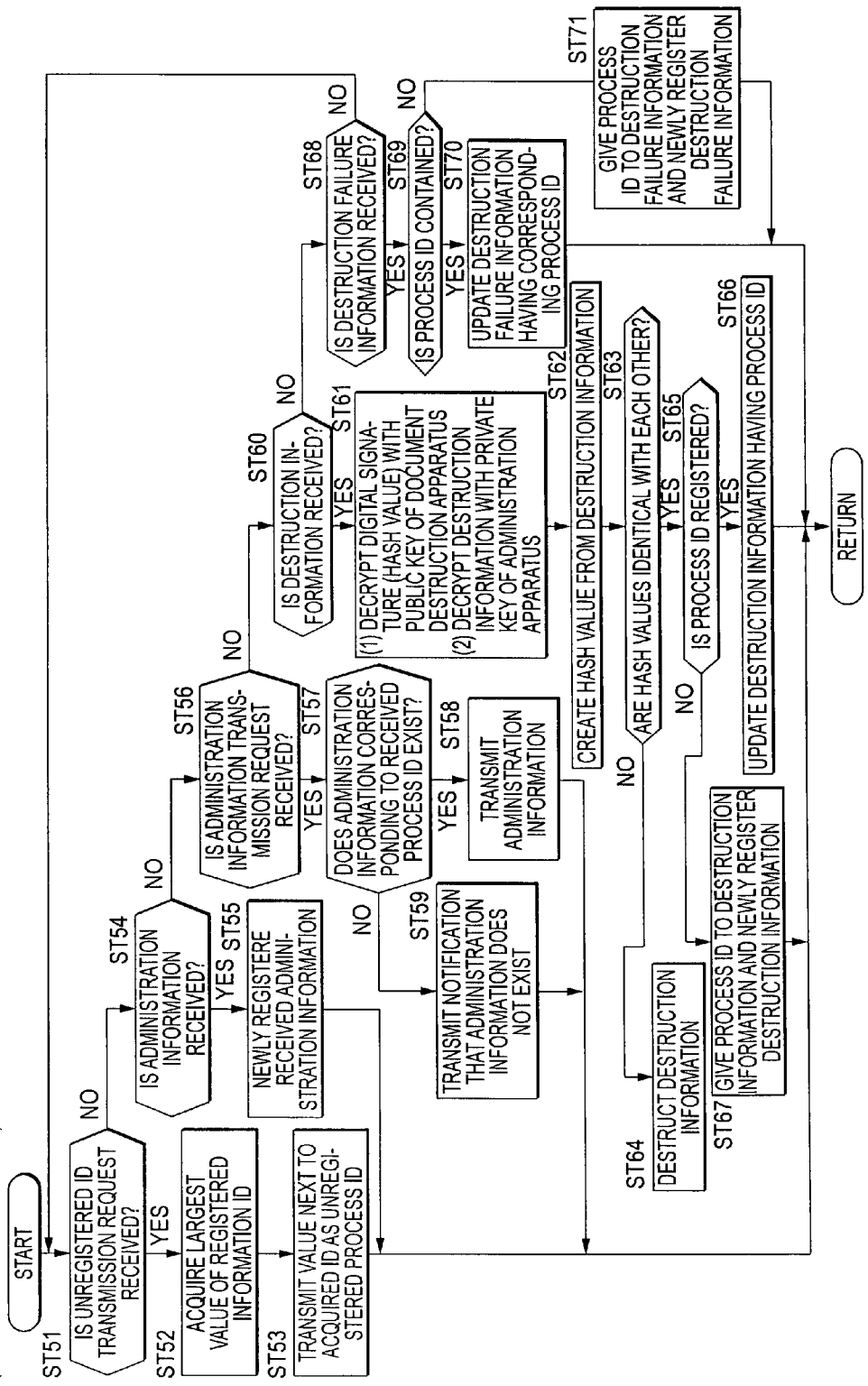
FIG. 17 is a flowchart of a document administration process in the administration apparatus according to the first exemplary embodiment of the invention.

FIG. 17 is a flowchart of a document administration process in the administration apparatus of the first exemplary embodiment.

Steps (ST) of the flowchart in FIG. 17 are executed in accordance with the document administration program P1 stored on the hard disk, etc., of the computer main body H1. This process is executed as multitasks concurrently with other various types of processing of the administration apparatus 9.

The flowchart in FIG. 17 is started when the document administration program P1 is started in the administration apparatus 9.

At ST51 in FIG. 17, whether or not an unregistered ID transmission request transmitted from the terminal 3, 4, 6 is received is determined. If the determination is yes (Y), the process goes to ST52; if the determination is no (N), the process goes to ST54.

At ST52, the largest value in the registered process IDs of the administration information is acquired. The process goes to ST53.

At ST53, the next value to the acquired process ID value is transmitted as an unregistered process ID. The process returns to ST51.

At ST54, whether or not the administration information transmitted from the terminal 3, 4, 6 is received is determined. If the determination is yes (Y), the process goes to ST55; if the determination is no (N), the process goes to ST56.

At ST55, the received administration information is newly registered. The process returns to ST51.

At ST56, whether or not an administration information transmission request transmitted from the document destruction apparatus 7 is received is determined. If the determination is yes (Y), the process goes to ST57; if the determination is no (N), the process goes to ST60.

At ST57, whether or not the administration information corresponding to the received process ID exists is determined. If the determination is yes (Y), the process goes to ST58; if the determination is no (N), the process goes to ST59.

At ST58, the administration information corresponding to the process ID is transmitted to the document destruction apparatus 7. The process returns to ST51.

At ST59, a notification that the administration information does not exist is transmitted to the document destruction apparatus 7. The process returns to ST51.

At ST60, whether or not destruction information transmitted from the document destruction apparatus 7 is received is determined. If the determination is yes (Y), the process goes to ST61; if the determination is no (N), the process goes to ST68.

At ST61, the following (1) and (2) are executed and the process goes to ST62:

(1) The digital signature encrypted with the private key of the document destruction apparatus 7 is decrypted with the public key of the document destruction apparatus 7 to acquire the hash value.

(2) The destruction information encrypted with the public key of the administration apparatus 9 is decrypted with the private key of the administration apparatus 9 to acquire the destruction information.

At ST62, a hash value which is certification information is created from the decrypted destruction information. The process goes to ST63.

At ST63, whether or not the hash value acquired by decrypting the digital signature and the hash value created from the destruction information are identical with each other is determined. If the determination is no (N), the process goes to ST64; if the determination is yes (Y), the process goes to ST65.

At ST64, the destruction information is destructed because there is a possibility that the destruction information may be falsified. The process returns to ST51.

At ST65, whether or not the received destruction information contains a process ID is determined. If the determination is yes (Y), the process goes to ST66; if the determination is no (N), the process goes to ST67.

At ST66, the destruction information having the contained process ID is updated. The process returns to ST51.

At ST67, the destruction information is given a process ID and is newly registered. The process returns to ST51.

At ST68, whether or not destruction failure information transmitted from the document destruction apparatus 7 is received is determined. If the determination is yes (Y), the process goes to ST69; if the determination is no (N), the process returns to ST51.

At ST69, whether or not the received destruction failure information contains a process ID is determined. If the determination is yes (Y), the process goes to ST70; if the determination is no (N), the process goes to ST71.

At ST70, the destruction failure information having the contained process ID is updated. The process returns to ST51.

At ST71, the destruction failure information is given a process ID and is newly registered. The process returns to ST51.

(Description of Flowcharts of Document Destruction Apparatus 7)

Figure 18:
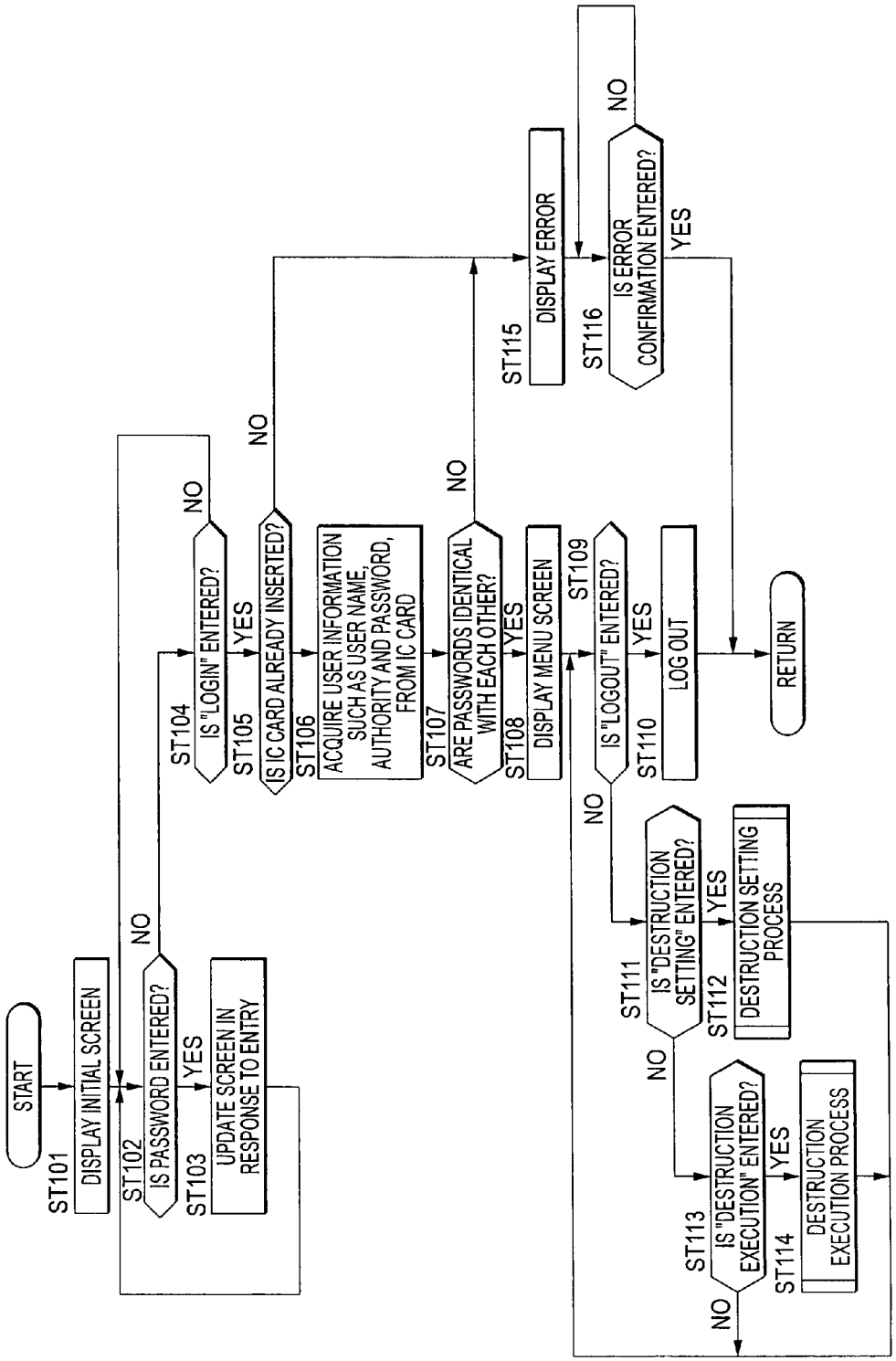
FIG. 18 is a main flowchart of the document destruction apparatus according to the first exemplary embodiment of the invention.

FIG. 18 is a main flowchart of the document destruction apparatus of the first exemplary embodiment.

Steps (ST) of the flowchart in FIG. 18 are executed in accordance with the document administration program P2 stored on the hard disk, etc., of the document destruction apparatus 7. This process is executed as multitasks concurrently with other various types of processing of the document destruction apparatus 7.

The flowchart in FIG. 18 is started when power of the document destruction apparatus 7 is turned on.

At ST101 in FIG. 18, the initial screen 51 is displayed on the display section 19b and the process goes to ST102.

At ST102, whether or not the user enters a password in the password input screen 51b with the input buttons 19c is determined. If the determination is yes (Y), the process goes to ST103; if the determination is no (N), the process goes to ST104.

At ST103, the initial screen 51 is updated in response to the entry. The process returns to ST102.

At ST104, whether or not the user presses the "login" icon 51c in the initial screen 51 is determined. If the determination is yes (Y), the process goes to ST105; if the determination is no (N), the process goes to ST102.

At ST105, whether or not an IC card is inserted into the card insertion slot 19a is determined. If the determination is yes (Y), the process goes to ST106; if the determination is no (N), the process goes to ST115.

At ST106, user information is acquired from the IC card. The user information includes, for example, a name of the user, namely, a destruction operator name; user's authority; and a user's password. The process goes to ST107.

At ST107, whether or not the password entered in the initial screen 51 and the password stored on the IC card are identical with each other is determined. If the determination is yes (Y), the process goes to ST108; if the determination is no (N), the process goes to ST115.

At ST108, the menu screen 56 is displayed on the display section 19b in response to the authenticated destruction operator name, and the process goes to ST109.

At ST109, whether or not the user enters selection of the "logout" icon 56d is determined. If the determination is yes (Y), the process goes to ST110; if the determination is no (N), the process goes to ST111.

At ST110, a logout process of releasing authentication of the user is executed, and the process returns to ST101.

At ST111, whether or not the user presses the "destruction setting" icon 56b in the menu screen 56 is determined. If the determination is yes (Y), the process goes to ST112; if the determination is no (N), the process goes to ST113.

At ST112, a destruction setting process of making settings as to whether or not destruction information is to be transmitted to the destruction operator, the certification party and/or the administrator (see a subroutine described later with reference to FIG. 19) is executed, and the process returns to ST109.

At ST113, whether or not the user presses the "destruction execution" icon 56c in the menu screen 56 is determined. If the determination is yes (Y), the process goes to ST114; if the determination is no (N), the process goes to ST109.

At ST114, a document destruction execution process of destructing the document (see a subroutine described later with reference to FIGS. 20 and 21) is executed, and the process returns to ST109.

At ST115, an error message is displayed on the display section 19b in response to the determination. The process goes to ST116.

At ST116, whether or not the user enters confirmation of contents of the error is determined. If the determination is no (N), ST116 is repeated, if the determination is yes (Y), the process returns to ST101.

(Description of Flowchart of Destruction Setting Process (Subroutine at ST112))

Figure 19:
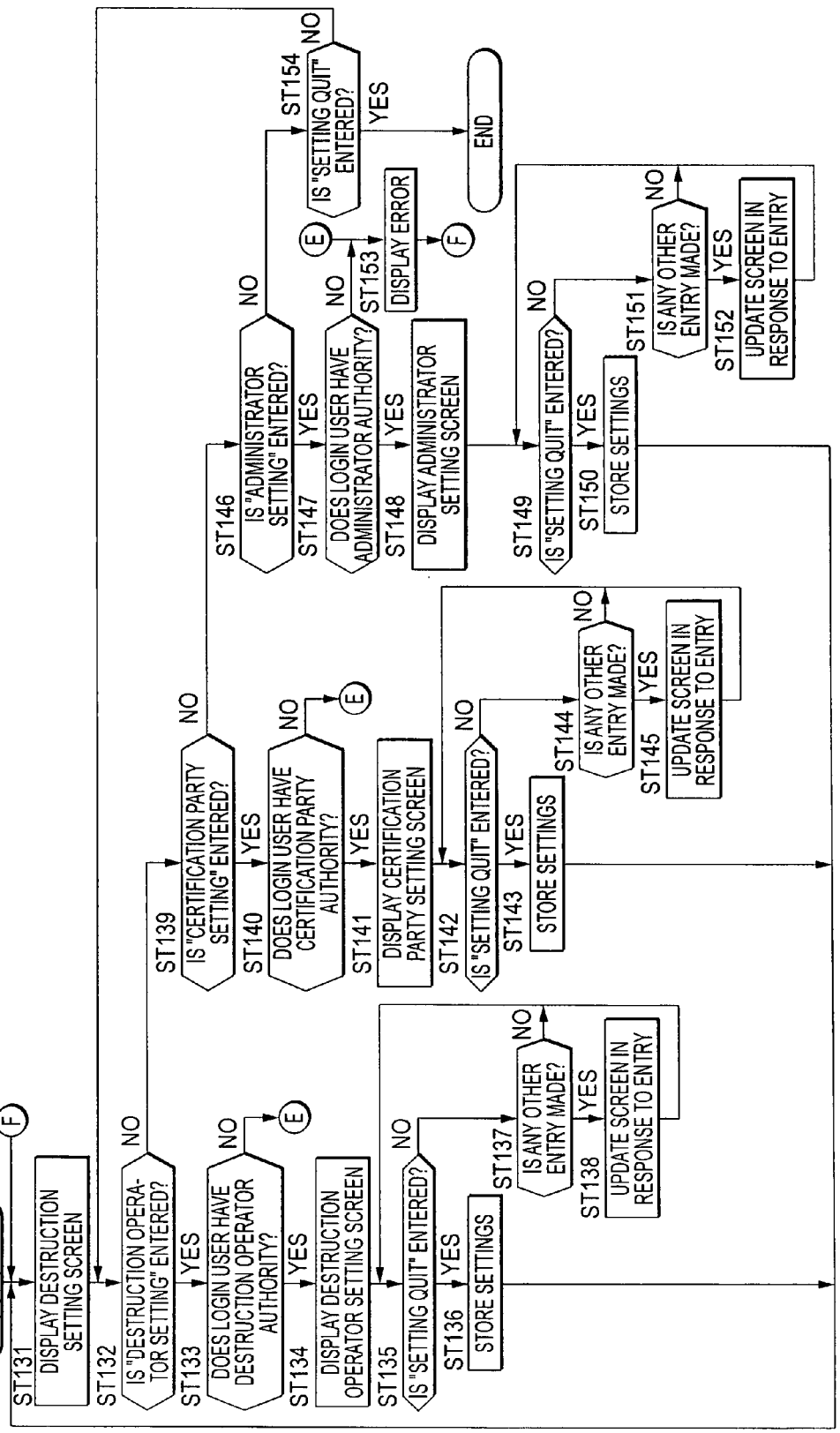
FIG. 19 is a flowchart of a destruction setting process according to the first exemplary embodiment of the invention to describe a subroutine at ST112 in FIG. 18.

FIG. 19 is a flowchart of the destruction setting process of the first exemplary embodiment to describe the subroutine at ST112 in FIG. 18.

At ST131 in FIG. 19, the destruction setting screen 61 is displayed on the display section 19b. The process goes to ST132.

At ST132, whether or not the user enters selection of the "destruction operator setting" icon 61b is determined. If the determination is yes (Y), the process goes to ST133; if the determination is no (N), the process goes to ST139.

At ST133, whether or not the login user, that is, the authenticated destruction operator has the authority of correcting the settings of a destruction operator is determined. If the determination is yes (Y), the process goes to ST134; if the determination is no (N), the process goes to ST153.

At ST134, the destruction operator setting screen 66 is displayed on the display section 19b. The process goes to ST135.

At ST135, whether or not the user enters selection of the "setting quit" icon 66h is determined. If the determination is yes (Y), the process goes to ST136; if the determination is no (N), the process goes to ST137.

At ST136, the settings made in the destruction operator setting screen 66 are stored. The process returns to ST131.

At ST137, whether or not the user has changed each setting in the destruction operator setting screen 66 is determined. If the determination is yes (Y), the process goes to ST138; if the determination is no (N), the process returns to ST135.

At ST138, the destruction operator setting screen 66 is updated in response to the entry and the process returns to ST135.

At ST139, whether or not the user enters selection of the "certification party setting" icon 61c is determined. If the determination is yes (Y), the process goes to ST140; if the determination is no (N), the process goes to ST146.

At ST140, whether or not the login user, that is, the authenticated destruction operator has the authority of correcting the setting of a certification party is determined. If the determination is yes (Y), the process goes to ST141; if the determination is no (N), the process goes to ST153.

At ST141, a certification party setting screen similar to the destruction operator setting screen 66 is displayed on the display section 19b. The process goes to ST142.

At ST142, whether or not the user enters selection of the "setting quit" icon 66h is determined. If the determination is yes (Y), the process goes to ST143; if the determination is no (N), the process goes to ST144.

At ST143, the settings made in the certification party setting screen are stored. The process returns to ST131.

At ST144, whether or not the user has changed each setting in the certification party setting screen is determined. If the determination is yes (Y), the process goes to ST145; if the determination is no (N), the process returns to ST142.

At ST145, the certification party setting screen is updated in response to the entry and the process returns to ST142.

At ST146, whether or not the user enters selection of the "administrator setting" icon 61*d* is determined. If the determination is yes (Y), the process goes to ST147; if the determination is no (N), the process goes to ST154.

At ST147, whether or not the login user, that is, the authenticated destruction operator has the authority of correcting the setting of an administrator is determined. If the determination is yes (Y), the process goes to ST148; if the determination is no (N), the process goes to ST153.

At ST148, an administrator setting screen similar to the destruction operator setting screen 66 is displayed on the display section 19*b*. The process goes to ST149.

At ST149, whether or not the user enters selection of the "setting quit" icon 66*h* is determined. If the determination is yes (Y), the process goes to ST150; if the determination is no (N), the process goes to ST151.

At ST150, the settings made in the administrator setting image are stored. The process returns to ST131.

At ST151, whether or not the user has changed each setting in the administrator setting image is determined. If the determination is yes (Y), the process goes to ST152; if the determination is no (N), the process returns to ST149.

At ST152, the administrator setting image is updated in response to the entry and the process returns to ST149.

At ST153, an error message notifying to the destruction operator that the destruction operator does not have the authority of setting is displayed on the display section 19*b*. The process returns to ST131.

At ST154, whether or not the user enters selection of the "setting quit" icon 61*e* in the destruction setting screen 61 is determined. If the determination is no (N), the process returns to ST132; if the determination is yes (Y), the destruction setting process in FIG. 19 is exited and the process returns to the main flowchart in FIG. 18.

(Description of Flowchart of Destruction Execution Process (Subroutine at ST114))

FIG. 20 is a flowchart of the destruction execution process of the first exemplary embodiment to describe the subroutine at ST114 in FIG. 18.

Figure 21:
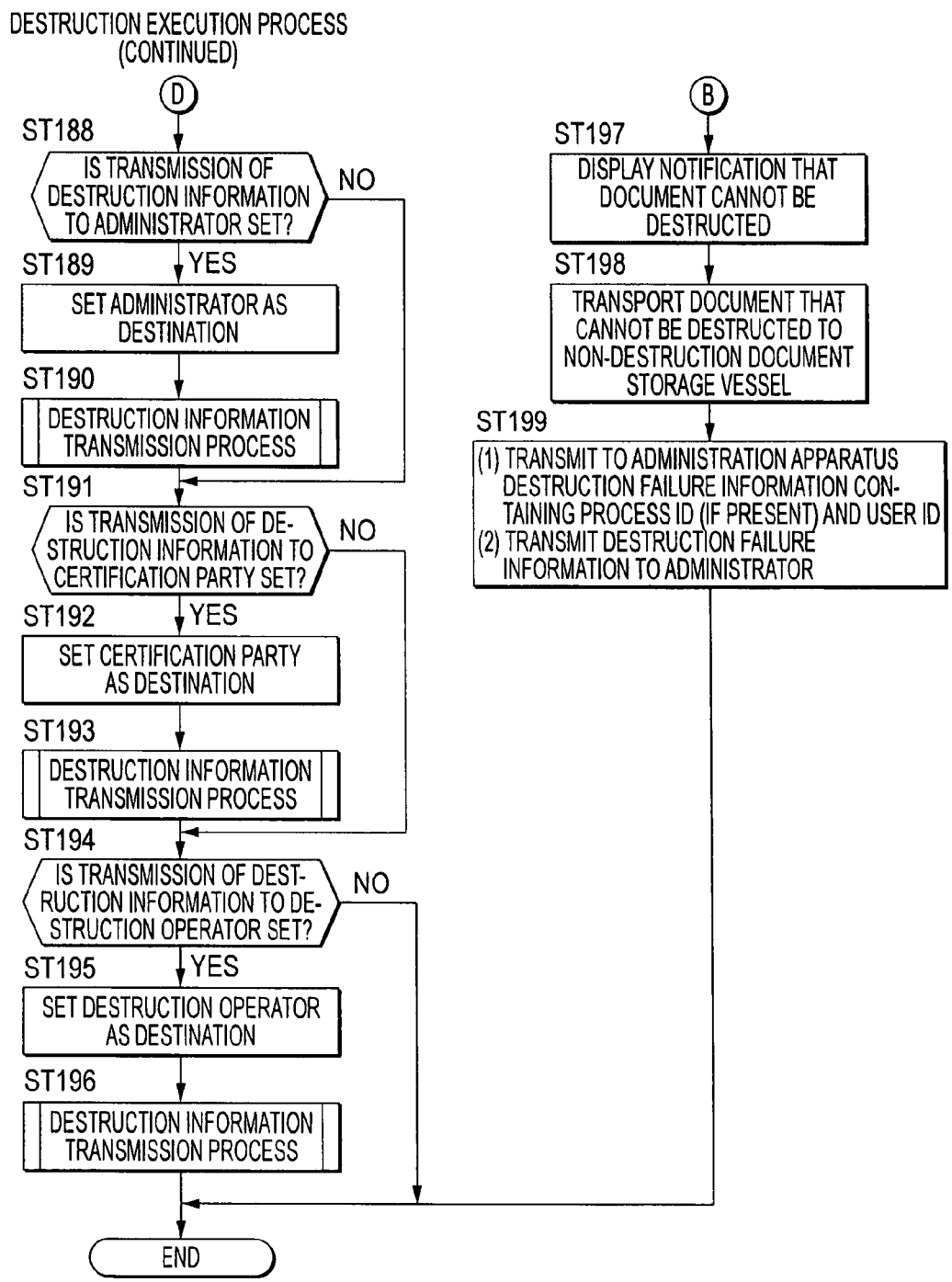
FIG. 21 is a flowchart of the destruction execution process according to the first exemplary embodiment of the invention; it is a continuation of FIG. 20.

FIG. 21 is a flowchart of the destruction execution process of the first exemplary embodiment; it is a continuation of FIG. 20.

At ST161 in FIG. 20, the following (1) and (2) are executed and the process goes to ST162:

(1) The document setting prompting screen 71 for prompting the user to set a document is displayed on the display section 19*b*.

(2) The image acquisition flag FL1 is set to "0."

At ST162, whether or not the paper sensor 23 detects a document is determined. If the determination is no (N), ST162 is repeated; if the determination is yes (Y), the process goes to ST163.

At ST163, the two-dimensional code assigned to the document 20 is read by the identification image reader 24. The process goes to ST164.

At ST164, whether or not a two-dimensional code exists in a portion, of the document, read by the identification image reader 24 is determined. If the determination is yes (Y), the process goes to ST165; if the determination is no (N), the process goes to ST173.

At ST165, the read two-dimensional code is decrypted to acquire the process ID. The process goes to ST166.

At ST166, the process ID is transmitted to the administration apparatus 9 and requests the administration apparatus 9 to transmit administration information. The process goes to ST167.

At ST167, whether or not the administration information is received is determined. If the determination is yes (Y), the process goes to ST168; if the determination is no (N), ST167 is repeated.

At ST168, the received administration information is stored. The process goes to ST169.

At ST169, whether or not the retention period has expired is determined based on the received administration information. If the determination is yes (Y), the process goes to ST170; if the determination is no (N), the process goes to ST197 in FIG. 21.

At ST170, whether or not the destruction authority is set for the document to be destructed is determined based on the received administration information. Specifically, in the first exemplary embodiment, whether or not the administrator is set is determined. If the determination is yes (Y), the process goes to ST171; if the determination is no (N), the process goes to ST174.

At ST171, whether or not the login user, that is, the authenticated destruction operator has the authority of destructing the document is determined. If the determination is yes (Y) (the destruction operator has the authority), the process goes to ST172; if the determination is no (N), the process goes to ST197 in FIG. 21.

At ST172, whether or not transmission of destruction information is set in any of destruction setting information is determined. If the determination is yes (Y), the process goes to ST173; if the determination is no (N), the process goes to ST174.

At ST173, the image acquisition flag FL1 is set to "1." The process goes to ST174.

At ST174, destruction preparation is complete, and the destruction start screen 76 for prompting the user to make the final confirmation to start destruction is displayed on the display section 19*b*. The process goes to ST175.

At ST175, whether or not the user enters selection of the "destruction start" icon 76*c* in the destruction start screen 76 is determined. If the determination is yes (Y), the process goes to ST176; if the determination is no (N), ST175 is repeated.

At ST176, it is started to drive the respective members of the document destruction apparatus 7 and to destruct the document by shredding the document with the shredder 34. The process goes to ST177.

At ST177, whether or not the image acquisition flag FL1 is "1" is determined. That is, when the image acquisition flag FL1 is "1," it means that no two-dimensional code is present, which is an example where the read condition is met, or that the retention period has expired and the user has the authority. If the determination is yes (Y), the process goes to ST178; if the determination is no (N), the process goes to ST182.

At ST178, if the read condition and the destruction condition are met, the image reader 29 is driven to read the image of the document 20. The process goes to ST179.

At ST179, whether or not the destruction process is complete is determined. If the determination is yes (Y), the process goes to ST180; if the determination is no (N), ST179 is repeated.

At ST180, it is stopped to drive the document destruction apparatus 7. The process goes to ST181.

At ST181, information is transmitted to and received from the time authentication terminal 11, and the time stamp which is the precise time information of the destruction time is acquired. The process goes to ST182.

At ST182, image-attached destruction information, which contains the read image, the destruction operator, the document destruction date, and the destruction apparatus ID is created. The destruction apparatus ID is an example of the destruction apparatus identification information to identify the document destruction apparatus 7 destructing the document. The process goes to ST187.

At ST183, if the read condition is not met but the destruction condition is met, whether or not the destruction process is complete is determined. If the determination is yes (Y), the process goes to ST184; if the determination is no (N), ST183 is repeated.

At ST184, it is stopped to drive the document destruction apparatus 7. The process goes to ST185.

At ST185, information is transmitted to and received from the time authentication terminal 11, and the time stamp which is the precise time information of the destruction time is acquired. The process goes to ST186.

At ST186, destruction information containing the destruction operator, the document destruction date and the identification information of the document destruction apparatus 7 is created. The process goes to ST187.

At ST187, the following (1) to (3) are executed and the process goes to ST188:
(1) The hash value which is an example of certification information of the created destruction information is created and is encrypted with the private key of the document destruction apparatus 7. That is, a digital signature is created.
(2) The destruction information is encrypted with the public key of the administration apparatus 9, which is an example of a target to which the destruction information is to be transmitted.
(3) The encrypted digital-signature-attached destruction information is transmitted to the administration apparatus 9.

At ST188 in FIG. 21, whether or not transmission of the destruction information to the administrator is set is determined based on the destruction setting information. If the determination is yes (Y), the process goes to ST189; if the determination is no (N), the process goes to ST191.

At ST189, the administrator is set as a destination, namely, a receiver which is an example of the target to which the destruction information is to be transmitted. The process goes to ST190.

At ST190, a destruction information transmission process for transmitting the destruction information in accordance with the settings (see a subroutine described later with reference to FIG. 22) is executed, and the process goes to ST191.

At ST191, whether or not transmission of the destruction information to the certification party is set is determined based on the destruction setting information. If the determination is yes (Y), the process goes to ST192; if the determination is no (N), the process goes to ST194.

At ST192, the certification party is set as the destination, namely, the receiver which is an example of the target to which the destruction information is to be transmitted. The process goes to ST193.

At ST193, the destruction information transmission process for transmitting destruction information in accordance with the settings (see the subroutine described later with reference to FIG. 22) is executed, and the process goes to ST194.

At ST194, whether or not transmission of the destruction information to the destruction operator is set is determined based on the destruction setting information. If the determination is yes (Y), the process goes to ST195; if the determination is no (N), the destruction execution process in FIGS. 20 and 21 is exited and the process returns to the main flowchart in FIG. 18.

At ST195, the destruction operator is set as the destination, namely, the receiver which is an example of the target to which the destruction information is to be transmitted. The process goes to ST196.

At ST196, the destruction information transmission process for transmitting destruction information in accordance with the settings (see the subroutine described later with reference to FIG. 22) is executed. Then, the destruction execution process in FIGS. 20 and 21 is exited and the process returns to the main flowchart in FIG. 18.

At ST197, if the retention period has not yet expired or the user does not have the destruction authority, which an example where the destruction condition is not met, the destruction failure screen 81 to inform the user that the document is not permitted to be destructed is displayed on the display section 19b. The process goes to ST198.

At ST198, the document destruction apparatus 7 is driven to transport the document, which is not permitted to be destructed, to the non-destruction document storage vessel 38 using the branch guide member 32, for storage. The process goes to ST199.

At ST199, the following (1) and (2) are executed. Then, the destruction execution process in FIGS. 20 and 21 is exited and the process returns to the main flowchart in FIG. 18.
(1) Destruction failure information containing: the identification information of the authenticated destruction operator; information of the destruction failure apparatus ID identifying the document destruction apparatus resulting in document destruction failure; the destruction failure date that can be acquired from internal clock which is an example of information of the destruction failure time; and the process ID if the process ID is assigned to the document, is transmitted to the administration apparatus 9 which is an example of the target to which the destruction failure information is to be transmitted.
(2) The same destruction failure information is transmitted to the administrator terminal 4 which is an example of the target to which the destruction failure information is to be transmitted.

(Description of Flowchart of Destruction Information Transmission Process (Subroutine at ST190, ST193, ST196))

Figure 22:
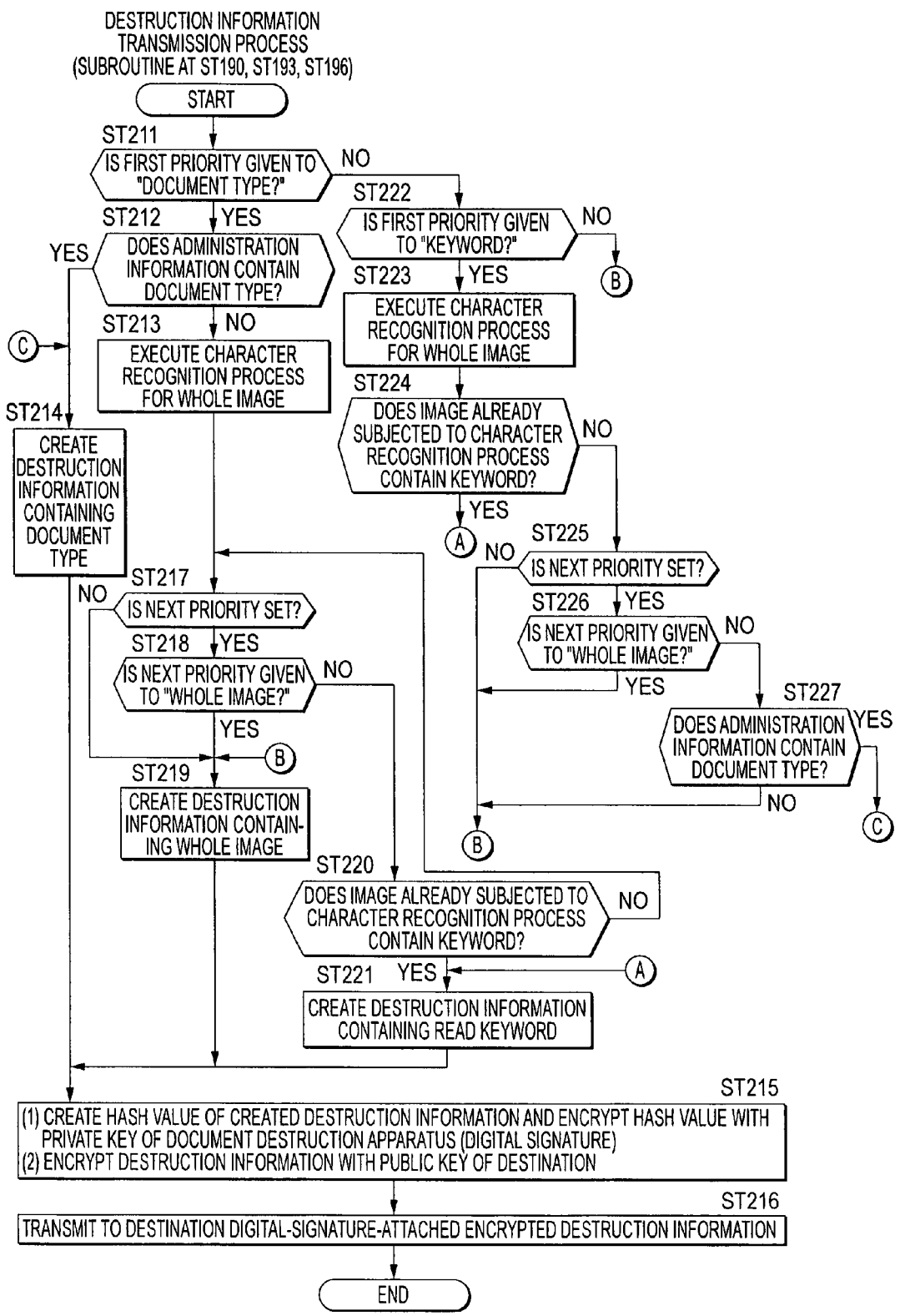
FIG. 22 is a flowchart of a process of transmitting destruction information, according to the first exemplary embodiment and is a flowchart of a subroutine at ST190, ST193, ST196 in FIG. 21.

FIG. 22 is a flowchart of the destruction information transmission process of the first exemplary embodiment and is a flowchart of the subroutine at ST190, ST193, ST196 in FIG. 21.

At ST211 in FIG. 22, whether or not a first priority which is used when the destruction information is transmitted to the destination (the destruction operator, the certification party or the administrator) is given to "document type" is determined based on the destruction settings. If the determination is yes (Y), the process goes to ST212; if the determination is no (N), the process goes to ST222.

At ST212, whether or not the received administration information contains document type information is determined. If the determination is no (N), namely, if document type information is not contained, the process goes to ST213; if the determination is yes (Y), namely, if document type information is contained, the process goes to ST214.

At ST213, a character recognition process is executed for the whole read image. The process goes to ST217.

At ST214, destruction information containing the document destruction operator, the document destruction date and the document type is created. The process goes to ST215.

At ST215, the following (1) and (2) are executed and the process goes to ST216:
(1) A hash value of the created destruction information is created and is encrypted with the private key of the document destruction apparatus 7, thereby creating a digital signature.
(2) The created destruction information is encrypted with the public key of the destination to create the encrypted destruction information.

At ST216, the digital-signature-attached encrypted destruction information is transmitted to the setup destination. The destruction information transmission process in FIG. 22 is exited, and the process returns to the destruction execution process in FIG. 21.

At ST217, whether or not a next priority is set is determined based on the destruction settings. If the determination is yes (Y), the process goes to ST218; if the determination is no (N), the process goes to ST219.

At ST218, whether or not the next priority is "whole image" is determined. If the determination is yes (Y), the process goes to ST219; if the determination is no (N), the process goes to ST220.

At ST219, destruction information containing the whole image is created, and the process goes to ST215.

At ST220, whether or not the image, which is already subjected to the character recognition process, contains a preset specific keyword is determined. If the determination is yes (Y), the process goes to ST221; if the determination is no (N), the process returns to ST217.

At ST221, destruction information containing the read keyword is created and the process goes to ST215.

At ST222, whether or not the first priority is given to "keyword" is determined based on the destruction settings. If the determination is yes (Y), the process goes to ST223; if the determination is no (N), the process goes to ST219.

At ST223, a character recognition process is executed for the whole read image. The process goes to ST224.

At ST224, whether or not the image, which is already subjected to the character recognition process, contains a keyword is determined. If the determination is yes (Y), the process goes to ST221; if the determination is no (N), the process goes to ST225.

At ST225, whether or not a next priority is set is determined based on the destruction settings. If the determination is yes (Y), the process goes to ST226; if the determination is no (N), the process goes to ST219.

At ST226, whether or not the next priority is given to "whole image" is determined. If the determination is yes (Y), the process goes to ST219; if the determination is no (N), the process goes to ST227.

At ST227, whether or not the administration information contains document type information is determined. If the determination is no (N), namely, if document type information is not contained, the process goes to ST219; if the determination is yes (Y), namely, if document type information is contained, the process goes to ST214.

Operation of First Exemplary Embodiment

In the document administration system S of the first exemplary embodiment, the newly created document 20 is given the identification image 20a, is output and is retained. Information such the retention period and the document administrator is registered as administration information and is managed.

To destruct the document, if the document 20 is given the identification image 20a and is managed according to the administration information, the administration information is referenced. Generally, for most confidential documents involved in accounting (bills, receipts, statements of accounts, etc.,), the time period in which the confidential document must be retained is specified. To destruct the confidential document, whether or not the confidential document to be destructed is really destructed may be checked based on an original ledger. In the document administration system S of the first exemplary embodiment, however, the retention period and the authority of the destruction operator are checked automatically.

If an attempt is made to destruct the document by mistake, for example, if the retention period is not yet reached or if the destruction operator does not have the authority of destructing the document, the document 20 is not destructed and is collected into the non-destruction document storage vessel 38.

If an attempt is made to destruct a document given no identification image 20a and involving no administration information, it is unsure whether or not the document is to be destructed correctly or is attempted to be destructed by mistake. Thus, the whole image of the document is read, registered and managed in the administration apparatus to make it possible to later check the destruction document.

Further, in the document administration system S of the first exemplary embodiment, the fact that the document is destructed and the destruction information concerning destructed contents are transmitted to the destruction operator, the certification party and/or the administrator in accordance with the settings. At this time, the transmitted destruction information contains the precise destruction time acquired by executing communications with the time authentication terminal 11. Also, the transmitted destruction information is encrypted at a high security level and has a digital signature, so as to prevent falsification. Any of the document type, the read keyword, or the whole image may be contained in the destruction information in accordance with the settings.

Second Exemplary Embodiment

FIG. 23 is a flowchart of a destruction execution process according to a second exemplary embodiment of the invention and corresponds to FIG. 20 in the first exemplary embodiment.

Next, a document administration system S according to the second exemplary embodiment of the invention will be described. Components identical with or similar to those of the document administration system S of the first exemplary embodiment are denoted by the same reference numerals and will not be described again in detail. The second exemplary embodiment is the same as the first exemplary embodiment except the following point.

In the destruction execution process of the second exemplary embodiment shown in FIG. 23, if the determination at ST169 or ST171 is no (N), the process goes to ST17.3 rather than ST197. In this case, ST197 to ST199 become substantially unnecessary and are skipped.

Operation of Second Exemplary Embodiment

In the described document administration system S of the second exemplary embodiment, a document is destructed although the retention period has not expired or the destruction operator does not have the authority of destructing the document. However, the whole image of the document is read and registered in the administration information so that the user can check what the document is after the document is destructed by mistake. That is, in the second exemplary embodiment, the destruction condition is automatically met and the read condition is set so that it is met if a two-dimensional code exists, if the retention period has not expired, if the user does not have the authority of destructing the document, or if transmission of destruction information is set.

Third Exemplary Embodiment

FIG. 24 is a flowchart of a destruction execution process according to a third exemplary embodiment of the invention and corresponds to FIG. 20 in the first exemplary embodiment.

Figure 25:
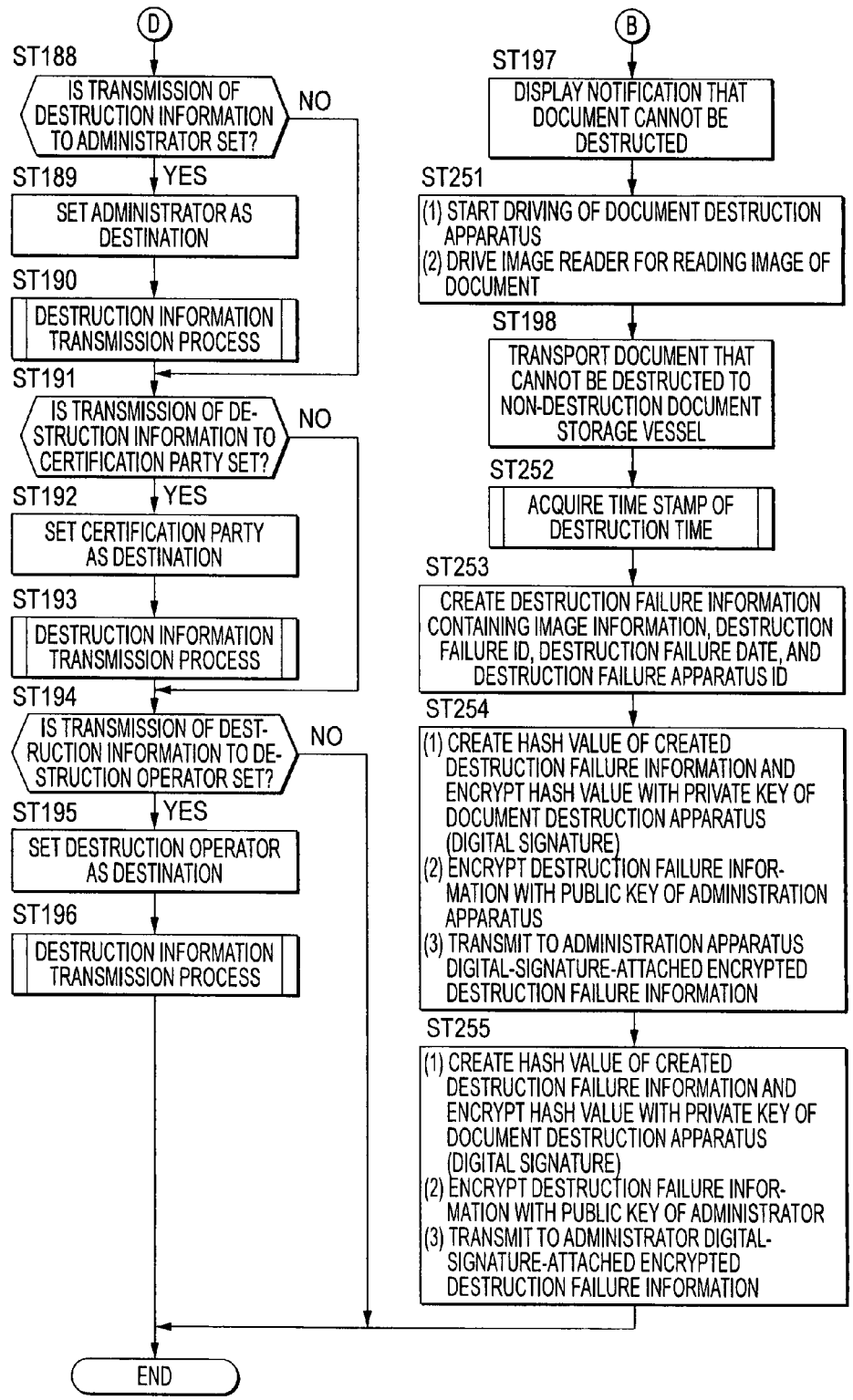
FIG. 25 is a flowchart of a continuation of the destruction execution process according to the third exemplary embodiment of the invention and corresponds to FIG. 21 in the first exemplary embodiment of the invention.

FIG. 25 is a flowchart of a continuation of the destruction execution process according to the third exemplary embodiment of the invention and corresponds to FIG. 21 in the first exemplary embodiment.

Next, a document administration system S according to the third exemplary embodiment of the invention will be described. Components identical with or similar to those of the document administration system S of the first exemplary embodiment are denoted by the same reference numerals and will not be discussed again in detail. The third exemplary embodiment is the same as the first exemplary embodiment except the following points:

In the destruction execution process of the third exemplary embodiment shown in FIGS. 24 and 25, if the determination at ST164 is no (N), the process goes to ST197 rather than ST173.

In FIG. 25, after ST197 is executed, the process goes to ST251.

At ST251 in FIG. 25, the following (1) and (2) are executed and the process goes to ST198:
(1) It is started to derive the respective members of the document destruction apparatus 7 and to transport a document 20.
(2) The image reader 29 is driven for reading an image of the document 20.

After ST198 is executed, the process goes to ST252.

At ST252, information is transmitted to and is received from the time authentication terminal 11 and a time stamp which is precise time information of the destruction failure time is acquired. The process goes to ST253.

At ST253, destruction failure information containing image information, the destruction failure ID which is an example of identification information of the destruction failure of the authenticated user, the destruction failure date, and the destruction failure apparatus ID which is an example of identification information identifying the document destruction apparatus 7 resulting in failure of destruction is created. The process goes to ST254.

At ST254, the following (1) to (3) are executed and the process goes to ST255:
(1) A hash value of the created destruction failure information is created and is encrypted with the private key of the document destruction apparatus 7. That is, digital signature is created. The hash value is an example of certification information of the destruction failure information.
(2) The destruction failure information is encrypted with the public key of the administration apparatus 9.
(3) The digital-signature-attached encrypted destruction failure information is transmitted to the administration apparatus 9.

At ST255, the following (1) to (3) are executed and the destruction execution process in FIGS. 24 and 25 is exited:
(1) The hash value of the created destruction failure information is created and is encrypted with the private key of the document destruction apparatus 7. That is, digital signature is created. The hash value is an example of certification information of the created destruction failure information.
(2) The destruction failure information is encrypted with the public key of the administrator.
(3) The digital-signature-attached encrypted destruction failure information is transmitted to the administrator terminal 4.

Unlike the administration apparatus of the first exemplary embodiment, the administration apparatus 9 of the third exemplary embodiment receives the encrypted destruction failure information, decrypts the destruction failure information and determines as to whether or not the destruction failure information is falsified by performing similar a process to that of the encrypted destruction information. This process is simple and therefore description and illustration of a flowchart therefore are omitted.

Operation of Third Exemplary Embodiment

In the document administration system S of the third exemplary embodiment, if a two-dimensional code 20a which is identification information of the document 20 is not assigned and administration information is not registered, the document is not destructed to prevent erroneous destruction. If administration information is not registered, if the retention period has not expired, or if the user does not have the authority of destructing the document, image information is read to secure the document 20 resulting in failure of destruction. The read image information is encrypted in a state where it is contained in the destruction failure information, and is transmitted to the administration apparatus 9 and the administrator. That is, in the third exemplary embodiment, the destruction condition is set so that it is met if the retention period has expired and the destruction authority is not set or if the retention period has expired and the destruction authority is set and the user has the destruction authority and transmission of destruction information is set. On the other hand, the read condition is set so that it is met if the retention period has expired and the destruction authority is set and the user has the destruction authority and transmission of destruction information is set.

MODIFIED EXAMPLES

Although the exemplary embodiments of the invention have been described in detail above, it is to be understood that the invention is not limited to the exemplary embodiments and that various modifications and changes can be made without departing from the spirit and the scope of the invention according to claims. Modified examples of the invention (H01) to (H012) are illustrated below:

(H01) In the exemplary embodiments, the network N includes the local area network 2 and the Internet 1 by way of example. However, the invention is not limited thereto. The network may be only an intranet or only the Internet. A leased line may be used to provide a line of any desired configuration of connection. For example, the time authentication terminal 11 and the public key providing terminal 12 are not limited to those on the Internet and may also be connected to an intranet.

(H02) In the exemplary embodiments, when information is transmitted and received, it is desirable that the information should be encrypted. However, encryption may be skipped. In the exemplary embodiments, in a transmission request of unencrypted administration information and in transmission of destruction failure information in the first exemplary embodiment, the information may be encrypted for transmission and reception, of course.

The private key and the public key are used as the encryption technology. However, the encryption technology is not limited to the technology. Information may be encrypted using any desired encryption technology, for example, in such a manner that information is encrypted all with the private key, that information is transmitted and received using a common key, or that a password is set.

(H03) In the exemplary embodiments, in transmitting of destruction information in accordance with the settings, if the document type or a read keyword is not detected, the read image is transmitted although transmission of read image is not set. However the read image may not be transmitted.

(H04) In the exemplary embodiments, the document destruction apparatus has the shredder and the non-destruction document storage vessel. However, the invention is not limited to this configuration. The non-destruction document storage vessel may also be omitted. Alternatively, an ejection tray to which a document that is not permitted to be destructed is ejected may be provided for returning the document that is not permitted to be destructed to the destruction operator.

(H05) In the exemplary embodiments, the document administration system S includes the administration apparatus 9, the terminals 3, 4, and 6, the document destruction apparatus 7, the image forming apparatus 8 having a scanner, etc., by way of example. However, the invention is not limited to this configuration. For example, any desired configuration may be adopted wherein the administrator terminal 4 and the administration apparatus 9 are made common; the function of the administration apparatus 9 is incorporated in the document destruction apparatus 7; the terminals 3, 4, and 6 are made common; and/or the document destruction apparatus 7 is provided with (i) a scanner for reading a attached receipt and (ii) an ejection tray to which a document whose image has been read is ejected. In addition, the time may be acquired using the internal clock of the administration apparatus 9 with the time authentication terminal 11 omitted. The public key provided by the public key providing terminal 12 may be stored in the administration apparatus 9 to omit the public key providing terminal 12. That is, the functions of the components 3 to 12 may be collected or distributed.

(H06) In the exemplary embodiments, each image may be changed as desired in terms of the layout, item deletion, addition, etc., in accordance with the design, the setting, and the specifications.

(H07) In the exemplary embodiments, a two-dimensional code is shown as the document identification information by way of example. However, the invention is not limited thereto. Any desired document identification information such as a bar code or numeric document identification information may be adopted. For example, identification information of paper using a paper fiber pattern or identification information embedded in an image by providing a print image with fine density variation rather than the code may be used as the document identification information.

(H08) In the exemplary embodiments, permission or no permission of destruction, necessity or unnecessity of reading an image, and the like are determined in accordance with the retention period, the destruction authority, the document identification information, and the presence or absence of user's setting by way of example. However, the determination conditions are not limited thereto. For example, one, two, or three of the four determination conditions may be adopted or an additional determination condition may be set. For example, a time zone may be adopted as a determination condition so that destruction is not permitted when the destruction time is beyond the working time. Also, the number of sheets that can be destructed may be set for each user as a determination condition so that the user cannot destruct any document if the number of sheets that can be destructed is exceeded.

(H09) In the exemplary embodiments, destruction information is transmitted every time one sheet is destructed. However, the invention is not limited thereto. Plural sheets may be destructed continuously or the document identification information of each page may be read in sequence and be destructed or retained.

(H010) In the exemplary embodiments, if a document does not involve administration information, if the retention period has not expired or if the destruction operator does not have the destruction authority, the whole image of the document to be destructed is read and is registered by way of example. However, the invention is not limited thereto. A partial image or a keyword image from which it can be seen which document the document is may be read. To read an image, a color document may be read as a monochrome image or the image may be read with a low resolution to such an extent that the image can be later checked rather than with a comparatively high resolution to enable print reproduction.

(H011) In the exemplary embodiments, whether or not the retention period has expired is determined by making a comparison between the date of the retention period and the current date on which destruction is executed. However, the invention is not limited thereto. For example, whether or not the retention period has expired may be determined according to any desired method of finding an elapsed time from the document creation date to the current date and comparing the elapsed time with a preset retention period.

(H012) In the exemplary embodiments, the administration apparatus and the administrator are shown as the targets to which the destruction failure information is to be transmitted by way of example. However, the invention is not limited thereto. The destruction failure information may be transmitted to the destruction operator and the certification party which are the transmission targets.

What is claimed is:

1. A document administration system comprising:
    a document administration apparatus including:
        a document administration information storage section that stores administration information containing at least document identification information assigned to a document and a retention period of the document, and
        a document image storage section; and
    a document destruction apparatus including:
        an identification information reader that reads, from the document, the document identification information assigned to the document,
        a first determination section that determines, based on a reading result by the identification information reader, as to whether or not the document identification information is assigned to the document, and
        a document reader, wherein if the document meets a predetermined read condition, the document reader reads the document to acquire an image of the document, and if no document identification information is assigned to the document, the document reader reads the document to acquire the image of the document and the document image storage section stores the image of the document acquired by the document reader.

2. The system according to claim 1, wherein the document destruction apparatus further includes:
    a document destruction member, a second determination section, wherein if the document identification information is assigned to the document, the second determination section determines, based on the document identification information, as to whether or not the retention period of the document has expired, and a controller that controls the document destruction member to destruct the document if the retention period of the document has expired; and if the retention period of the document has not been expired, the document reader reads the document to acquire the image of the document and the document image storage section stores the acquired image of the document.

3. The system according to claim 1, wherein the document destruction apparatus further includes:

a document destruction member; and a controller that controls the document destruction member to destruct the document which has already been read by the document reader.

4. The system according to claim 3, wherein the document destruction apparatus further includes a destruction time information acquisition section that acquires a destruction time at which the document is destructed, and the document administration information storage section stores the destruction time acquired by the destruction time information acquisition section as one piece of the administration information.

5. The system according to claim 1, wherein the document destruction apparatus further includes a destruction operator authentication section that identifies a destruction operator who is to destruct the document.

6. The system according to claim 5, wherein the document destruction apparatus further includes:

a document administration information storage section that stores the administration information containing a destruction authority for the document, a first identification section that identifies a destruction authority of the destruction operator authenticated by the destruction operator authentication section, a second identification section that identifies the destruction authority for the document based on the document identification information and the administration information, a third determination section that determines as to whether or not the destruction operator has the destruction authority for the document, based on the destruction authority of the destruction operator identified by the first identification section and the destruction authority for the document determined by the second identification section, a document destruction member, and a controller that controls the document destruction member to destruct the document if the destruction operator has the destruction authority for the document.

7. The system according to claim 6, wherein if the destruction operator does not have the destruction authority for the document, the document reader reads the document to acquire the image of the document, the document image storage section stores the image of the document acquired by the document reader and the controller controls the document destruction member to destruct the document read by the document reader.

8. The system according to claim 5, wherein the document administration information storage section stores information of the destruction operator identified by the destruction operator authentication section as one piece of information included in the administration information.

9. The system according to claim 1, wherein the document destruction apparatus further includes a document storage section that stores the document which has already been read by the document reader.

10. The system according to claim 1, wherein the predetermined read condition includes a condition that the document is not permitted to be destructed is satisfied.

11. The system according to claim 10, wherein if a destruction operator who is to destruct the document has no destruction authority for the document, the document is not permitted to be destructed.

12. The system according to claim 10, wherein if the retention period has not expired, the document is not permitted to be destructed.

13. The system according to claim 10, wherein if no document identification information is assigned to the document, the document is not permitted to be destructed.

14. A document destruction apparatus configured to be connected to an administration apparatus comprising a document administration information storage section that stores administration information containing at least document identification information assigned to a document and a retention period of the document via a communication line, the document destruction apparatus comprising:

an identification information reader that reads, from the document, the document identification information assigned to the document, a first determination section that determines, based on a reading result by the identification information reader, as to whether or not the document identification information is assigned to the document, and a document reader that reads the document to acquire an image of the document if the document meets a predetermined read condition, the document reader that reads the document to acquire the image of the document if no document identification information is assigned to the document.

15. The apparatus according to claim 14, further comprising:

a document destruction member;

a second determination section, wherein if the document identification information is assigned to the document, the second determination section determines, based on the document identification information, as to whether or not the retention period of the document has expired; and a controller that controls the document destruction member to destruct the document if the retention period of the document has expired, wherein: if the retention period of the document has not been expired, the document reader reads the document to acquire the image of the document.

16. The apparatus according to claim 14, further comprising: a document destruction member; and a controller that controls the document destruction member to destruct the document which has already been read by the document reader.

17. The apparatus according to claim 16, further comprising: a destruction failure information transmission section, wherein if the document is not destructed, the destruction failure information transmission section transmits to the transmission target destruction failure information indicating that the document is not destructed.

18. The apparatus according to claim 14, further comprising: a destruction information transmission section that transmits to a transmission target destruction information indicating that the document has been destructed.

19. The apparatus according to claim 18, further comprising: a destruction operator authentication section that identifies a destruction operator who is to destruct the document, wherein the destruction information contains destruction operator information indicating the destruction operator identified by the destruction operator authentication section.

20. The apparatus according to claim 18, wherein the destruction information contains the image of the document read by the document reader.

21. The apparatus according to claim 18, further comprising: a destruction information encryption section that encrypts the destruction information, wherein the destruction information transmission section transmits to the transmission target the destruction information encrypted by the destruction information encryption section.

22. The apparatus according to claim 21, wherein the destruction information encryption section encrypts the destruction information with a public key of the transmission target, which is set uniquely for the transmission target.

23. The apparatus according to claim 21, further comprising: an electronic signature section that adds an electronic signature of the document destruction apparatus to the destruction information encrypted by the destruction information encryption section, with a private key of the document destruction apparatus which is set uniquely for the document destruction apparatus, wherein the destruction information transmission section transmits to the transmission target the encrypted destruction information to which the electronic signature is added.

24. The apparatus according to claim 14, further comprising: a document storage section that stores the document which has already been read by the document reader.

25. The apparatus according to claim 18, wherein the transmission target is a party to whom a fact that the document has been destroyed is to be proved.

26. The apparatus according to claim 18, wherein the transmission target is an administrator who administrates the document.

27. The apparatus according to claim 18, wherein the transmission target is a destruction operator who destructs the document.

28. The apparatus according to claim 27, further comprising: a destruction failure information encryption section that encrypts the destruction failure information with a public key of the transmission target which is set uniquely for the transmission target, wherein the destruction failure information transmission section transmits the encrypted destruction failure information to the transmission target.

29. The document destruction apparatus according to claim 18, wherein the transmission target is the administration apparatus.

30. A document administration system comprising:
    a document administration information storage section that stores administration information containing at least document identification information assigned to a document and a retention period of the document;
    an identification information reader that reads, from the document, the document identification information assigned to the document;
    a determination section that determines as to whether or not the retention period of the document has expired, based on the document identification information read by the identification information reader;
    a document reader that reads the document to acquire an image of the document if the document meets a predetermined read condition;
    a document destruction member; and
    a controller that controls the document destruction member to destroy the document if the document meets a predetermined destruction condition.

31. The system according to claim 30, wherein the predetermined destruction condition includes a condition that the retention period of the document has expired.

32. The system according to claim 30, wherein the predetermined destruction condition includes a condition that the document identification information is assigned to the document.

33. The system according to claim 30, wherein the predetermined read condition includes a condition that the retention period of the document has not yet expired.

34. The system according to claim 30, wherein the predetermined read condition includes a condition that no document identification information is assigned to the document.

* * * * *